(12) United States Patent
McColl et al.

(10) Patent No.: US 6,763,519 B1
(45) Date of Patent: Jul. 13, 2004

(54) MULTIPROGRAMMED MULTIPROCESSOR SYSTEM WITH LOBALLY CONTROLLED COMMUNICATION AND SIGNATURE CONTROLLED SCHEDULING

(75) Inventors: William F. McColl, North Oxford (GB); Jonathan M. D. Hill, Oxford (GB); Leslie G. Valiant, Belmont, MA (US); Stephen R. Donaldson, Oxford (GB)

(73) Assignee: Sychron Inc., San Mateo, CA (US)

( * ) Notice: Subject to any disclaimer, the term of this patent is extended or adjusted under 35 U.S.C. 154(b) by 0 days.

(21) Appl. No.: 09/305,570

(22) Filed: May 5, 1999

(51) Int. Cl.[7] ............................................... G06F 9/46
(52) U.S. Cl. .................... 718/100; 718/102; 718/104; 718/107; 709/202; 709/226; 712/1; 712/28
(58) Field of Search ................. 712/28, 1; 709/100, 709/102, 104, 107, 202, 226

(56) References Cited

U.S. PATENT DOCUMENTS 3,593,300 A * 7/1971 Driscoll et al. ............. 718/104
4,249,186 A * 2/1981 Edwards ..................... 346/35

(List continued on next page.)

OTHER PUBLICATIONS

Chun, B.N., et al., "Virtual Network Transport Protocols for Myrinet," *IEEE Micro*,:53–63 (1998).

(List continued on next page.)

*Primary Examiner*—Meng-Al T. An
*Assistant Examiner*—Lilian Vo

(74) *Attorney, Agent, or Firm*—John A. Smart; G. Mack Riddle

(57) ABSTRACT

A multiprogrammed multiprocessor system comprises a plurality of processors and some communications resources such as networks through which the processors communicate with each other. A plurality of tasks may be executed on the system, and the allocation of the communications resources among the tasks is globally controlled. The allocation of resources among the tasks running on the system can be dependent on the signature of the tasks, where one component of a task signature is a measure of the communication resources needed by the task. The scheduling of a task running on the system may also be dependent on the signature of the task. The allocation of communications resources can be globally controlled using a variety of techniques including: packet injection into the communications resources using periodic strobing or using global flow control; using global implicit acknowledgments; by destination scheduling; by pacing; or by prioritized communication scheduling. Error recovery overheads can be amortized over a plurality of jobs running at one node. A user interface allows a plurality of service level options to be specified by a user, where the system can guarantee that the service levels can be achieved. Application users as well as system administrators can choose options as are appropriate. The user interface can allow the system administrator to run a scheduling mechanism that distributes communications resources among the tasks according to a market mechanism. The user interface can also allow a task to be guaranteed a fixed fraction of the resources independent of the other tasks then running or to be run as an interactive continuous job at one of a plurality of service levels. Finally, the user interface allows a system administrator to subdivide system resources into reserved and unreserved components, where the unreserved component is made available according to a market mechansim.

40 Claims, 11 Drawing Sheets

U.S. PATENT DOCUMENTS

| | | | | |
|---|---|---|---|---|
| 5,083,265 A | | 1/1992 | Valiant | 395/800 |
| 5,325,525 A | * | 6/1994 | Shan et al. | 709/104 |
| 5,369,570 A | * | 11/1994 | Parad | 705/8 |
| 5,448,732 A | * | 9/1995 | Matsumoto | 718/104 |
| 5,602,916 A | * | 2/1997 | Grube et al. | 380/270 |
| 5,608,870 A | | 3/1997 | Valiant | 392/200.01 |
| 5,625,832 A | * | 4/1997 | Ohsawa et al. | 712/28 |
| 5,956,644 A | * | 9/1999 | Miller et al. | 455/453 |
| 5,970,051 A | * | 10/1999 | Mack et al. | 370/241 |
| 6,003,061 A | * | 12/1999 | Jones et al. | 709/104 |
| 6,006,197 A | * | 12/1999 | d'Eon et al. | 705/10 |
| 6,016,305 A | * | 1/2000 | Borst et al. | 370/234 |
| 6,041,354 A | * | 3/2000 | Biliris et al. | 709/226 |
| 6,230,200 B1 | * | 5/2001 | Forecast et al. | 709/226 |
| 6,230,205 B1 | * | 5/2001 | Garrity et al. | 709/231 |
| 6,262,991 B1 | * | 7/2001 | Dyke et al. | 370/420 |
| 6,304,967 B1 | * | 10/2001 | Braddy | 713/150 |
| 6,345,287 B1 | * | 2/2002 | Fong et al. | 709/102 |
| 6,363,411 B1 | * | 3/2002 | Dugan et al. | 709/202 |
| 6,366,945 B1 | * | 4/2002 | Fong et al. | 709/104 |
| 6,385,638 B1 | * | 5/2002 | Baker-Harvey | 709/107 |
| 6,414,368 B1 | * | 7/2002 | May et al. | 257/523 |
| 6,446,125 B1 | * | 9/2002 | Huang et al. | 709/226 |
| 6,446,126 B1 | * | 9/2002 | Huang et al. | 709/226 |
| 2003/0140172 A1 | * | 7/2003 | Woods et al. | 709/248 |

OTHER PUBLICATIONS

Ciaccio, G., "Optimal Communication Performance on Fast Ethernet with GAMMA," *Proc. Workshop PC–NOW, IPPS/SPDP'98, LNCS 1388*:534–548 (1998).

Donaldson, S.R., et al., "Exploiting Global Structure for Performance on Clusters," *Proc. IPPS/SPDP,* San Juan, Puerto Rico, (1999).

Donaldson, S.R., et al., "Performance Results of a Reliable Low–latency Communication Protocol for Clusters," *Proc. PC–NOW'99*: International Workshop on Personal Computer Based Networks of Workstations, Held in Conjunction with *IPPS/SPDP,* San Juan, Puerto Rico, (1999).

Donaldson, S.R., et al., "Predictable Communication on Unpredictable Networks: Implementing BSP over TCP/IP," *Proc. EuroPar'98, LNCS 1470*: 970–980 (1998).

Gerbessiotis, A.V. and Valiant L.G., "Direct Bulk–Synchronous Parallel Algorithms," *J. of Parallel and Distributed Computing* 22(2):251–267 (1994).

Goudreau, M.W., et al., "Towards efficiency and portability: Programming the BSP model," *Proc. 8th ACM Symposium on Parallel Algorithms and Architectures* pp:1–12 (1996).

Goudreau, M.W. and Rao, S.B., "Single–Message vs. Batch Communication,"*In Algorithms for Parallel Processing vol. 105 of IMA Volumes in Mathematics and Applications*:61–74 (1998).

Hill, J.M.D., et al., "BSPlib: The BSP Programming Library," *Parallel Computing* 24(14): 1947–1980 (1998).

Hill, J.M.D. and Skillicorn, D.B., "Lessons learned from implementing BSP," *Future Generation Computer Systems* 13(4–5):327–335 (1998).

Jones, J.P. and Brickell, C., "Second Evaluation of Job Queueing/Scheduling Software: Phase 1 Report," *NAS Technical Report NAS–97–013*: 1–32 (1997).

McColl, W.F., "Foundations of Time–Critical Scalable Computing," *Proc. 15th IFIP World Computer Congress (Fundamentals–Foundations of Computer Science)*:93–107 (1998).

Pakin, S. et al., "Fast Messages (FM): Efficient, Portable Communication for Workstation Clusters and Massively–Parallel Processors," *IEEE Concurrency* 5(2):60–73 (1997).

Prylli, L. and Tourancheoua, B., "BIP: A new protocol designed for high performance networking on Myrinet," *Proc. Workshop PC–NOW, IPPS/SPDP'98, LNCS 1388*:472–485 (1998).

Skillicorn, D.B., et al., "Questions and answers about BSP," *Journal of Scientific Programming* 6(3):249–274 (1997).

Valiant, L.G., "A Bridging Model for Parallel Computation," *CACM* 33(8):103–111 (1990).

von Eicken, T. and Vogels, W., "Evolution of the Virtual Interface Architecture," *IEEE Computer*: 61–68 (1998).

Welsh, M., et al., "Low–Latency Communication over Fast Ethernet," *Proc. EuroPar'96, LNCS 1123*: 187–194 (1996).

Valiant, L.G., "A Combining Mechanism for Parallel Computers," *In Parallel Architectures and Their Efficient Use* : 1–10 (1992).

Donaldson, S., et al., "BSP Clusters: High Performance, Reliable and Very Low Cost," *Programming Research Group, PRG–TR–5–98:*1–37.

Hill, J.M.D., et al., "Process Migration and Fault Tolerance of *BSPLIB* Programs Running on Networks of Workstations," *Programming Research Group, PRG–TR–41–97*: 1–11.

Hill, J.M.D. and Skillicorn, D.B., "Practical Barrier Synchronisation," *Programming Research Group, PRG–TR–16–96*:1–9.

Hill, J.M.D., et al., "Stability of Communication Performance in Practice: From the Cray T3E To Networks of Workstations," *Programming Research Group, PRG–TR–33–97*: 1–33.

Donaldson, S.R., et al., "Communication performance optimisation requires minimising variance," *Future Generation Computer Systems* 15:453–459 (1999).

* cited by examiner

Message Combining and Destination Scheduling in a Single BSP Program

Volume of communication in two supersteps of BSP Program B

Schedule with equal allocation of communication resources

System Level Design

MULTIPROGRAMMED MULTIPROCESSOR SYSTEM WITH LOBALLY CONTROLLED COMMUNICATION AND SIGNATURE CONTROLLED SCHEDULING

BACKGROUND OF THE INVENTION

Over the past five years, many researchers have developed new software systems for improved communication in multiprocessor systems. The goal has been to achieve low latency and high bandwidth. The approach has been to remove much of the redundancy in protocol stacks, and eliminate buffer copying by integration of kernel-space with user-space buffer management. For details, see for example [1,2,3,14,16,20,21]. This work has demonstrated that impressive improvements in latency can be achieved when sending a single message or for sparse communication patterns. However, for many of the dense communication patterns which arise in practice, e.g., when large coarse-grain parallel applications are run on moderately parallel architectures, this locally controlled approach to communications management has not provided an effective and efficient solution.

Inefficient, locally controlled communication is a legacy of the dominance of synchronous message passing as a parallel programming style throughout the 1980s and early 1990s. If implemented directly, i.e., as the programmer specifies, then many message passing programs will be inherently inefficient in many cases. This is because any one process in a message passing program cannot efficiently coordinate its actions within the machine with all the other processes which are simultaneously computing, communicating and synchronizing. A process in a message passing program cannot normally combine messages with others for the same destination, nor can it tell if it is a good time to send because the network is lightly loaded, or a bad time because it is heavily congested.

Bulk synchronous parallelism (BSPY, described in [17, 19] which are incorporated herein by reference in their entirety, is an alternative programming style in which a program is structured as a sequential composition of parallel "supersteps". BSP programs can achieve major communication performance improvements over equivalent message passing programs. These improvements are based on the use of global control techniques such as Batch communication. Efficient oblivious routing of general communications as a series of structured communication patterns such as total exchange [7,8,9].

Repackaging. All messages for a given destination are combined. The combined message is packaged and sent in the most efficient form for the particular network [11].

Destination scheduling. The order in which messages are sent is globally managed and controlled in order to avoid contention at the destination nodes. The global control is non-oblivious, i.e., the scheduling strategy is dynamically determined by the system, taking account of the particular structure of the communication pattern to be realized. This information is determined from data sent during the BSP barrier synchronization [11,17].

Pacing. The injection of new messages into the network is globally controlled to ensure that the total applied load is maximized, but that it does not exceed the level at which network throughput will start to decrease. As with destination scheduling, a non-oblivious method is used to minimize contention [6].

Global implicit acknowledgments. The structure of a BSP computation allows an implementation to avoid sending unnecessary acknowledgments in certain cases. Suppose that the packets from one superstep are colored red, and those of the next superstep are colored green. If processor i has sent red packets to processor j which are currently unacknowledged, and processor i receives a green packet from processor k, then it knows that all processors must have (logically) passed through a global barrier synchronization, and it can regard all red packets as implicitly acknowledged [4].

These techniques rely on the semantics of the BSP model, and on exploiting knowledge about the global structure of the communications. With BSP, a process that is about to communicate can know exactly which other processes are about to communicate, and how much they plan to send, and can therefore know the global applied load. Exploiting this knowledge has been shown to significantly improve the performance of communications on point-to-point networks. This BSP-based globally controlled communication allows one to achieve low latency and high bandwidth in those situations which arise frequently in practical applications, where traffic is dense and irregular.

Globally controlled communication for single program systems has been used to develop high performance native implementations of BSPlib [10], a BSP communications library, for a number of cluster [3,15], symmetric multiprocessor (SMP) [3] and massively parallel processor [3] architectures, in particular, for the following parallel architectures: Silicon Graphics Origin 2000, Silicon Graphics Power Challenge, Cray T3D, Cray T3E, IBM SP2, Convex Exemplar, Sun Multiprocessor, Digital 8400, Digital Alpha Farm, Hitachi SR2001, Fujitsu AP1000. Generic implementations of BSPlib for single program systems have also been produced for any scalable parallel architecture which provides at least one of the following: TCP/IP, UDP/IP, Unix System V Shared Memory, MPI, Cray SHMEM, PARMACS. Papers [4,5,6,7,11,17] describe the above techniques for globally controlled communication in single program systems.

FIG. 1 illustrates the methods of message combining and destination scheduling in a single BSP program. It shows how the messages in a single BSP program can be combined and globally scheduled to avoid unnecessary overheads and minimize destination contention. We briefly describe this operation. In superstep t 100:

Processor P1 105 has four messages, identified by the target numbers corresponding respectively to processors P2, P3, P4, P2.

Processor P2 110 has two messages, one for P1, and one for P3.

Processor P3 115 has two messages, one for P2, and one for P4.

Processor P4 120 has five messages, for processors P2, P1, P2, P2 and P3.

When all of the processors have completed their local computations, and initiated all of their communications, a barrier synchronization 125 is performed.

On each processor, messages destined for the same processor are combined (Step 130). The injection of these combined messages into the network is scheduled to avoid destination contention. As shown in the figure, this can be done by first realizing the permutation (P1→P2, P2→P3, P3→P4, P4→P1) (Step 135), then realizing (P1→P3, P2→P4, P3→P1, P4→P2) (Step 140), then finally realizing (P1→P4, P2→P1, P3→P2, P4→P3) (Step 145).

When a processor has received all of its incoming messages 150 it can begin the local computations of superstep t+1 155.

Efficient global communication in the BSP style is discussed in U.S. Pat. No. 5,083,265, "Bulk-Synchronous Parallel Computer," issued to Leslie G. Valiant and incorporated herein by reference in its entirety. A global mechanism for realizing complex patterns of communication for which it is efficacious for packets to a common destination to be combined at nodes other than the sender or receiver is discussed in U.S. Pat. No. 5,608,870, "System for combining a plurality of requests referencing a common target address into a single combined request having a single reference to the target address," also issued to Leslie G. Valiant and incorporated herein by reference in its entirety. The techniques and mechanisms for realizing multiprogrammed BSP machines that are the substance of the present invention are not, however, anticipated in either of these earlier patents.

Work on the BSP model [17,19] has also shown that the resources available on any multiprocessor system can be accurately characterized in terms of a concise "machine signature" which describes number of processors, processor speed, global communications capacity, global synchronization cost (p,s,g,l respectively), and possibly several other measures such as memory capacity, input/output capacity, and external connectivity.

The BSP model also permits the resources required by any parallel job to be characterized by a concise "job signature" of the form (W,H,S), where W,H,S denote the computation, communication and synchronization requirements respectively [13]. The cost of the job when run on a machine with BSP parameters g and l will be W+H·g+S·l. The job signature may have additional components, characterizing the memory or I/O requirements, for example.

Given the job signature of a program it is straightforward to evaluate its runtime, or some other resource consumption measure, for any machine with a given machine signature. For example, the percentage processor utilization we will achieve when running a BSP code with job signature (W,H, S) on a single program BSP system with parameters g and l is given by the simple formula $100/(1+g/G+l/L)$ where G=W/H and L=W/S. Since machines with higher values of g and l are in general less expensive, this provides a methodology for quantifying how cost-effective it is to run a particular job on a particular machine.

Reference [13] provides a number of machine signatures for various BSP systems (Table 1), analytic job signatures for BSP algorithms (Table 2), and experimental job signatures for BSP programs (Table 3). It also shows the percentage processor utilization for various program-system pairs (Table 4).

TABLE 1

Machine Signatures for Various Parallel Architectures Running Single BSP Programs

| System | p | s | g | l |
|---|---|---|---|---|
| SGI Origin 2000 | 4 | 101 | 10.2 | 1789 |
| SGI Origin 2000 | 8 | 101 | 15.1 | 3914 |
| SGI Origin 2000 | 16 | 101 | 44.9 | 15961 |
| Intel PC Cluster (100 Mbit switched ethernet) | 4 | 88 | 7.7 | 7839 |
| Intel PC Cluster (100 Mbit switched ethernet) | 8 | 88 | 7.7 | 12219 |

TABLE 1-continued

Machine Signatures for Various Parallel Architectures Running Single BSP Programs

| System | p | s | g | l |
|---|---|---|---|---|
| Cray T3E | 4 | 47 | 1.8 | 357 |
| Cray T3E | 8 | 47 | 1.6 | 506 |
| Cray T3E | 16 | 47 | 1.7 | 751 |
| IBM SP2 | 4 | 26 | 8.0 | 3583 |
| IBM SP2 | 8 | 26 | 11.4 | 5412 |
| Sun Multiprocessor | 4 | 10 | 4.1 | 118 |
| Hitachi SR2001 | 4 | 5 | 3.0 | 2299 |
| Hitachi SR2001 | 8 | 5 | 3.1 | 3844 |
| Hitachi SR2001 | 16 | 5 | 3.0 | 4638 |
| Intel PC Cluster (10 Mbit shared ethernet) | 4 | 61 | 1128.5 | 139981 |
| Intel PC Cluster (10 Mbit shared ethernet) | 8 | 61 | 1994.1 | 539159 |
| Intel PC Cluster (10 Mbit shared ethernet) | 16 | 61 | 3614.6 | 2884273 |

TABLE 2

Analytic Job Signatures for BSP Algorithms (specified to constant factors, where n is the size of the input).

| Problem | W | H | S |
|---|---|---|---|
| Matrix Multiplication | $n^3/p$ | $n^2/p^{2/3}$ | 1 |
| Sorting | $(n \log n)/p$ | $n/p$ | 1 |
| Fast Fourier Transform | $(n \log n)/p$ | $n/p$ | 1 |
| LU Decomposition | $n^3/p$ | $n^2/p^{1/2}$ | $p^{1/2}$ |
| Cholesky Factorization | $n^3/p$ | $n^2/p^{1/2}$ | $p^{1/2}$ |
| Algebraic Path Problem (Shortest Paths) | $n^3/p$ | $n^2/p^{1/2}$ | $p^{1/2}$ |
| Triangular Solver | $n^2/p$ | n | p |
| String Edit Problem | $n^2/p$ | n | p |
| Dense Matrix-Vector Multiplication | $n^2/p$ | $n/p^{1/2}$ | 1 |
| Sparse Matrix-Vector Multiplication (2D grid) | n/p | $(n/p)^{1/2}$ | 1 |
| Sparse Matrix-Vector Multiplication (3D grid) | n/p | $(n/p)^{2/3}$ | 1 |
| Sparse Matrix-Vector Multiplication (random) | n/p | n/p | 1 |
| List Ranking | n/p | n/p | log p |

TABLE 3

Experimental Job Signatures for nxn Cholesky Factorization

| n | p | W | G (=W/H) | L (=W/S) |
|---|---|---|---|---|
| 512 | 4 | 16446443 | 41 | 10638 |
| 1024 | 4 | 114022704 | 72 | 36996 |
| 2048 | 4 | 969632003 | 153 | 157535 |
| 512 | 16 | 9009600 | 19 | 5827 |
| 1024 | 16 | 45479147 | 24 | 14756 |
| 2048 | 16 | 336442283 | 45 | 54661 |
| 1024 | 64 | 25896647 | 13 | 8402 |
| 2048 | 64 | 123532187 | 15 | 20070 |
| 2560 | 64 | 232941156 | 19 | 30287 |

TABLE 4

Percentage Processor Utilization for p = 4 for Matrix Multiplication, Cholesky Factorization and List Ranking.

| Prog | n | Origin | Cluster switched | T3E | SP2 | Sun | Hitachi | Cluster shared |
|---|---|---|---|---|---|---|---|---|
| MM | 128 | 95 | 95 | 99 | 96 | 98 | 98 | 16 |
| MM | 256 | 97 | 97 | 99 | 97 | 99 | 99 | 20 |

TABLE 4-continued

Percentage Processor Utilization for p = 4 for Matrix Multiplication, Cholesky Factorization and List Ranking.

| Prog | n | Origin | Cluster switched | T3E | SP2 | Sun | Hitachi | Cluster shared |
|---|---|---|---|---|---|---|---|---|
| MM | 512 | 98 | 99 | 100 | 99 | 99 | 99 | 33 |
| CF | 512 | 71 | 52 | 93 | 65 | 90 | 78 | 2 |
| CF | 1024 | 84 | 76 | 97 | 83 | 94 | 91 | 5 |
| CF | 2048 | 93 | 91 | 99 | 93 | 97 | 97 | 11 |
| LR | 4096 | 74 | 59 | 94 | 71 | 91 | 82 | 3 |
| LR | 16384 | 88 | 85 | 98 | 88 | 95 | 94 | 6 |
| LR | 65536 | 81 | 82 | 96 | 83 | 91 | 92 | 4 |
| LR | 262144 | 85 | 88 | 97 | 88 | 94 | 95 | 5 |

A large number of job scheduling systems for sequential and multiprocessor systems have been developed over the past thirty years. The design of these systems have been based on various assumptions, many of which are no longer relevant. Most such systems assume, for example, that:

It is most efficient to allow jobs to run to completion once they have started.

No accurate description of the resources required by the job is available to the scheduler.

All jobs can be simply and easily classified into a small number of standard categories. For example, many systems classify jobs simply as either interactive or batch.

A simple, statically defined scheduling policy will be adequate in all circumstances.

It is sufficient to monitor and control only the computation resources in a multiprocessor system.

Reference [12] provides an up-to-date, detailed and systematic analysis of the capabilities and limitations of six major job scheduling systems, including systems from leading research and development centers and commercial products from IBM, Platform Computing, GENIAS and Cray Research (now part of Silicon Graphics). The analysis provides detailed information on how well the various systems perform, measuring each one with respect to 62 different criteria. The results show clearly that on multiprogrammed multiprocessor systems in which the processors communicate with each other via some communication hardware, current job scheduling systems have a number of shortcomings. For example, they do not offer any of the flexibility and performance which can be obtained if one is able to suspend and resume a running job some number of times before it runs to completion.

The shared resources (computation, communication, memory, input/output) in a modern multiprocessor system can be regarded as a flexible collection of commodity resources. This view of a multiprocessor system permits a much wider range of types of tasks to coexist in a single shared system than has hitherto been the case. The workload at a particular time may consist of some complex mixture of jobs with widely differing resource requirements (compute intensive, communication intensive, memory-bound, input/output bound, highly synchronized, asynchronous, interactive, highly parallel, sequential, short duration, long running, constantly running, etc.) and with widely differing level of service requirements (absolute priority, relative priority, real-time, interactive, fixed deadline, batch, low cost/best effort, etc.) This new situation requires a much more flexible and dynamic approach to job scheduling on shared multiprocessor systems, one which is able to take account of the widely differing resource and level of service requirements of the jobs, and which is able to guarantee that service levels, once agreed, will be met.

SUMMARY OF THE INVENTION

The new design presented here can, for the first time, achieve the above goals.

We describe a new design for a multiprogrammed multiprocessor system with globally controlled communication and signature controlled scheduling. The design is based on a completely new multiprogrammed bulk synchronous parallel (MBSP) approach to scalable parallel computing. An MBSP multiprocessor operates in a strobing style, in which all of the processors in the system periodically barrier synchronize and perform any communication that has accrued from all the processes.

Any communication library, messaging interface or middleware system can be used to communicate between processors in the MBSP system. The whole collection of resulting communications is globally optimized, in a bulk synchronous manner, by the system.

The use of a single, unified run-time system for the management of communications offers major advantages in simplifying system management.

The design can be implemented on clusters, symmetric multiprocessors (SMPs), clusters of SMPs, and on mainframe architectures such as the System/390 architecture. It can be implemented to work with all standard operating systems.

The organization of communications in the design is based on a new five-layer communication model, which differs significantly from the standard OSI seven-layer reference model. The design pushes the error recovery process down into the network layer, and can take advantage of multiple networks and multiple network hardware units.

Generic parallel job signatures provide a concise characterization of the local computation and input/output, communication, memory and synchronization resources required by the job when run on the MBSP system. With such signatures, we can precisely and flexibly control the high level task scheduling in our system, enabling the system to offer a completely new and powerful form of service level management.

The system provides a universal, high-level control mechanism for a signature-driven task scheduler. The control mechanism uses a static or dynamic protocol between the task scheduler and an application agent to determine the quality of service to be provided to an application task when it is run on the system. This flexible and dynamic control mechanism enables individual application tasks, and the system as a whole, to achieve guaranteed quality of service across the whole range of service characteristics, including the ability to guarantee application deadlines, real-time and interactive response, absolute and relative priorities, application cost, or maximal system throughput.

Accordingly, in a preferred embodiment of the present invention, a multiprogrammed system comprises a plurality of processors and some communications resources through which the processors communicate with each other. A plurality of tasks can be executed on the system and the allocation of the communications resources among the tasks running on the system is globally controlled. The communications resources preferably comprise a plurality of networks.

Preferably, the allocation of resources among the tasks running on the system is dependent on the signature of the tasks. One component of a task signature is a measure of the communication resources needed by the task.

Furthermore, the scheduling of a task running on the system may be dependent on the signature of the task.

In a preferred embodiment of the present invention, the allocation of communications resources is globally controlled by one or more of the following techniques: packet injection into the communications resources using periodic strobing, or using global flow control; global implicit acknowledgments; destination scheduling; pacing; or prioritized communication scheduling.

Preferably, the overheads of error recovery are amortized over a plurality of jobs running at one node.

Preferably, a user interface, implemented for example in software, allows a plurality of service level options to be specified by a user, where the system can guarantee that the service levels can be achieved. The user interface allows an application user as well as the system administrator to exercise options that are appropriate to their respective roles. The user interface preferably allows the system administrator to run a scheduling mechanism that distributes communications resources among the tasks according to a market mechanism. The user interface can allow a task to be guaranteed a fixed fraction of the resources independent of the other tasks then running. The user interface can allow a task to be run as an interactive continuous job at one of a plurality of service levels.

Preferably, the user interface allows a system administrator to have system resources subdivided into reserved and unreserved components, where the reserved components may be booked for exclusive use by users and user groups, and where the unreserved components are made available in accordance with some competitive or market mechanism.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
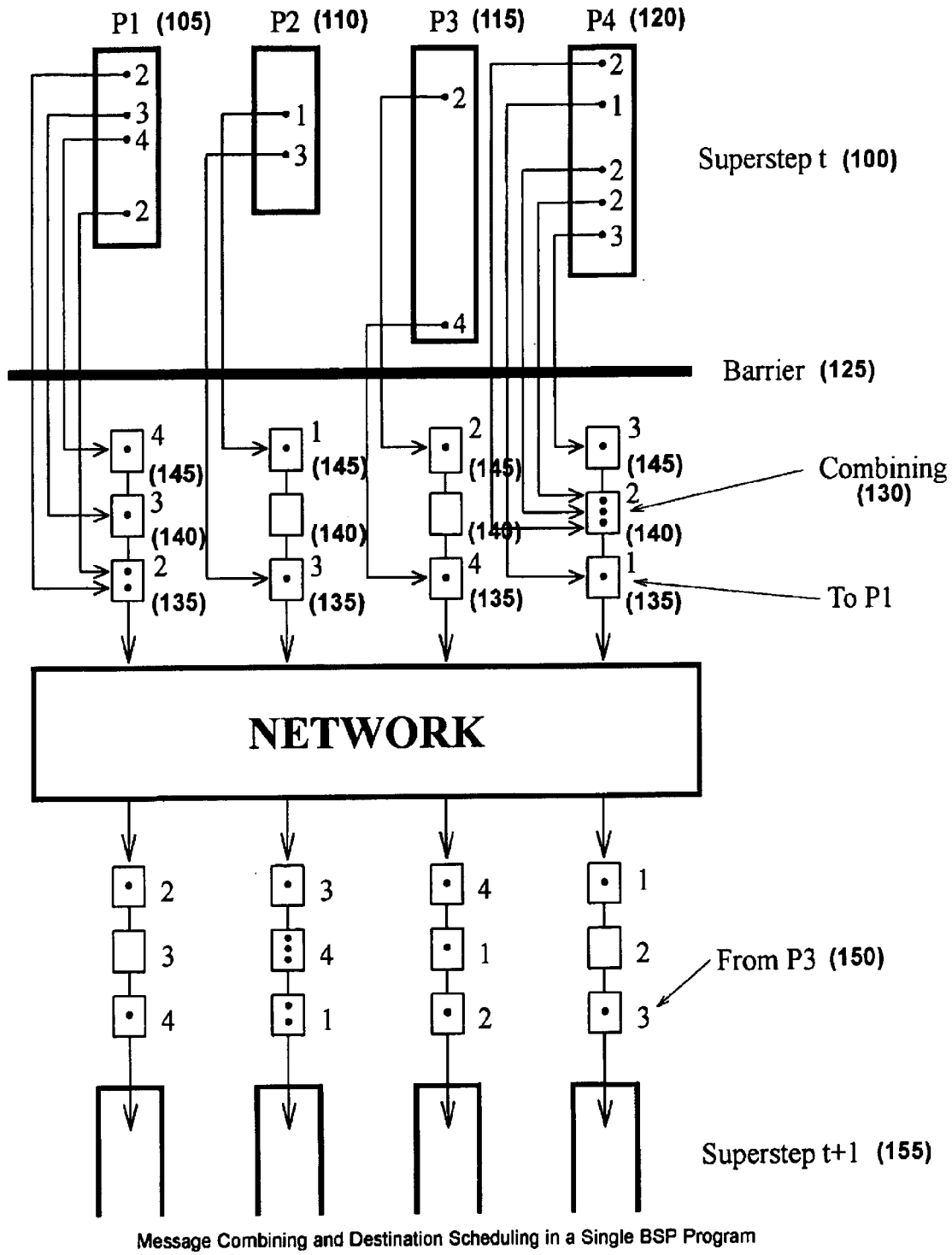
FIG. 1 is a schematic drawing illustrating the methods of message combining and destination scheduling in a single BSP program.

We now describe a new design for a multiprogrammed multiprocessor system with globally controlled communication and signature controlled scheduling.

Unlike previous designs based on BSP which globally control the communications in a single program system, this design is based on a completely new multiprogrammed BSP (M4BSP) approach. The system uses all the implementation techniques that are currently used in the single program implementations of BSP (for example message combining, global optimization of message scheduling, flow control, error recovery, global implicit acknowledgments), but moves them inside the operating system. An MBSP system therefore has BSP inside. This allows user programs to take advantage of BSP efficiencies, without necessarily having been written in a BSP style.

At the hardware level, an MBSP system is composed of components similar to any other BSP computer: a collection of processor nodes, a global communications interconnect for delivering packets in a point to point manner, and a mechanism for globally synchronizing all of the processors. The MBSP multiprocessor operates in a strobing style, in which all of the processors in the system periodically barrier synchronize and perform any communication that has accrued from all the processes. The implementation of the strobing mechanism takes advantage of all the global optimizations that are available to single program implementations of BSP; however, MBSP allows many different jobs (processes) to concurrently download packets for communication. Moving BSP inside the operating system allows programs that are not themselves written in a BSP style to download packets for transmission. Therefore, any communication library, messaging interface or middleware system (for example IP, TCP/IP, UDP/IP, BSPlib, MPI, PVM, VIA RPC, CORBA, MQ Series) can be used to communicate between processors in the MBSP system. The whole collection of resulting communications is globally optimized, in a bulk synchronous manner, by the system.

This approach to globally controlled communications has the following advantages:

The communications that arise from a set of programs can be overlapped with the computations in those programs.

A collection of parallel programs with unbalanced computation or communication may, when run together, give the same behavior as a single well-balanced program. Therefore, parallel programs running on an MBSP system need not be as carefully balanced by the user to achieve good performance as they would if they were run in single program mode.

As the cost of a single process communicating h words to one other process is approximately the same as the cost of p processors communicating h words to distinct processors, we can, by multiprogramming, fill in these "spare communication cycles" when user programs are sparse, by merging many sparse communications together to produce a single, more efficient dense communication pattern.

The synchronization costs of many parallel programs running concurrently can be amortized over the whole set of programs.

The use of a single unified run-time system for the management of communications also offers advantages in simplifying system management. This has a major impact on the total cost of ownership for clusters and clusters of SMPs.

1. Scope of The Design

The design can be:

implemented on clusters [3,15], symmetric multiprocessors (SMPs) [3], clusters of SMPs, and on mainframe architectures such as the System/390 architecture. (The IBM System/390 Parallel Sysplex is an example of a mainframe architecture organized as a cluster of SMPs [15].)

implemented on all kinds of point-to-point, local and system area networks, e.g., Fast Ethernet, Gigabit Ethernet, Myrinet, VIA-compatible networks, proprietary mainframe networks.

implemented on various network interface hardware units.

implemented on various input/output hardware units, for example RAID, Storage Area Networks.

implemented to work with all standard operating systems, e.g., Linux, Solaris, Windows 2000, OS/390.

Embodiments of this invention can vary in each of the components. By processors we mean any component that has computational processing power or has access to such. The communication medium can be any medium suitable for communicating information, including electronic, optical and radio. The processors can be all similar or they may have substantial dissimilarities. They may be located within any distance of each other, for example, of the order of centimetres, or thousands of kilometers apart. The mechanisms described may be implemented in software or hardware or any combination of these.

2. The Design

We describe a design for the bulk synchronous phasing of computation, communication and input/output in multiple simultaneous programs. The design provides a globally controlled mechanism which offers:

protected communications;

high bandwidth;

efficient throughput for multiple tasks; and fault tolerance, due to bulk synchronous strobing.

The techniques and technologies used include:

message combining and repackaging for batch communication;

pacing and balanced message scheduling for flow control;

global implicit acknowledgments;

multiple networks and multiple network interface hardware units;

specialized network device drivers;

efficient interaction with operating system kernel;

minimal copying and buffering;

strobe-driven communication scheduling algorithm;

five-layer communication model with error recovery in the network layer; and tight coupling between low level communication layers, strobed communication scheduling, and high level job scheduling.

2.1. Globally Controlled Communication for Multiple Programs

The bulk synchronous phasing of computation and communications is controlled by a "strobing communications" mechanism. A strobe consists of two components: (1) a heartbeat that performs a barrier synchronization of all, or a subset, of the nodes in the system; and (2) the controlled injection into the network of up to a fixed number of packets through the network. A system strobes with a particular frequency (the time between successive strobes is the strobing gap), and each strobe has a duration that specifies up to a maximum number of bytes of data that can be communicated.

The gap and duration of the strobe need not be fixed parameters of the machine. In fact, preferably, higher-level job scheduling software (see section 2.6 below), controls these parameters to make best use of the system resources as a whole. The heartbeat of the strobe can be implemented in either hardware or software. A multiplicity of algorithms can be employed to implement the barrier in software (for example, algorithms that use a linear number of point-to-point communications, a logarithmic depth tree of point-to-point communications, a single broadcast message, etc.).

The strobing mechanism is a distributed algorithm that relies upon the weak cooperation of a group of nodes in the system. Each node in the system can have multiple jobs that download packets for injection into the network and transmission to the other nodes in the system. Instead of being transmitted immediately, the packets are held in a staging area for transmission at regular intervals. The strobing mechanism controls the transfer of packets from the staging area to their destination. It contains three components: (i) a heartbeat mechanism that determines when a node should initiate the downloading of packets onto the network; (ii) a global flow-control mechanism that uses information transmitted in the heartbeat to ensure that future packets are downloaded only if there is a willing recipient on the destination node; and (iii) a mechanism of controlling the relative amount of data which each process is allowed to communicate in a particular strobe.

(i) A Mechanism to Determine when to Initiate Packet Download: Heartbeats

There are a number of ways of providing a controlled download mechanism ranging from fully asynchronous to fully synchronous. In an asynchronous mechanism embodiment, each node in the system has an independent clock that initiates the downloading of packets onto the network at regular intervals. Although each node in the system is controlled, there is no global control because there is no exchange of data between the nodes. Without such an exchange, be it complete (every node receives information from every other node), or partial (only a subset of the nodes exchange information), it is not possible to perform global optimizations such as global flow control, see (ii).

A fully synchronous mechanism embodiment uses a periodic barrier synchronization of all nodes to bring them into a globally consistent state. An advantage of the fully synchronous mechanism is that by exchanging snapshots of nodes' states as part of the barrier mechanism (such as the nodes' computation and communications load averages, and an enumeration of which processes on each node are willing recipients of data), each node can cheaply acquire some global knowledge of the machine that can be used to best exploit the system resources as a whole. Even without the exchange of information in the barrier of the strobe, the barrier enables each process to deduce that the other nodes are in a similar state, so that, for example, a Latin-square communications schedule [11] can be used to avoid network congestion at the destination nodes.

A preferred embodiment of the present invention using the fully synchronous mechanism on an Ethernet network uses the broadcasting facility of Ethernet to transfer p pieces of information, from each particular node in the system, to each of the p−1 other nodes in the network in a single broadcast packet. This mechanism enables the effective transfer of about $p^2$ pieces of information in p broadcast packets.

Partially synchronous mechanisms can utilize the topology of the underlying network. For example, a cluster of clusters can be built from a communications network that consists of a tree of low port-density switches. All the nodes connected to a single switch can strobe at one rate, which may be independent of the rate used in other parts of the machine, while all the machines in the cluster as a whole strobe at a slower frequency. A partially synchronous scheme provides global information to a node, albeit with varying degrees of reliability due to the different ages of the data from different nodes (because of the differing strobing rates of different parts of the machine). Although this approach creates a machine with a bisection bandwidth that is a fraction of that of a monolithic cluster constructed from a single multi-stage network, it limits the number of broadcast packets that any particular node in the cluster has to receive before the downloading of packets is initiated. The low bisection bandwidth of the entire machine can also be remedied by clever utilization of job signatures (see section 2.5). For example, the higher-level job scheduling software can ensure that communication bound jobs are limited to a number of processors which can be accommodated within a single switch. Alternatively, computation bound jobs can be distributed amongst the switches as they infrequently communicate across the poor bisection bandwidth of the multiple switches.

Another technique of the preferred embodiment is based upon each node in the cluster calculating tolerances for the communication requirements of their jobs. For example, as well as using a job signature to calculate the expected completion time of a job given the current strobing gap and duration, it can also be used to calculate the values of gap and duration that can be tolerated so that there is a fixed increase in the total run time. For example, if a job is 95% computation bound (for example, see Table 4), then halving the communication capacity of the machine will only impact the 5% of the time spent in communication, which gives a marginal increase in run time.

Once a node calculates the values of the gap and strobing duration that the node can tolerate, the node can determine how often it should be involved in the strobe. Therefore if the machine has a notional strobing gap of t, then the node can decide to be involved once in every x strobes. During this strobe, each node broadcasts its heartbeat information to every other node in the network. However, by also including the value of x in the strobe information, all nodes can calculate how many processors are involved in any particular strobe; this number of nodes will be less than p, given a sufficiently rich mix of jobs.

Although the algorithms used to realize the partial and fully synchronous strobing mechanisms differ greatly, they all provide global information that can be used to make better use of the communications device as a whole.

(ii) Global Flow Control

Flow-control is a mechanism of controlling the rate at which a sending process transmits packets to a destination node. Typically it involves the receiving node slowing down (or speeding up) the sending process by means of a pair-wise exchange of control data. The purpose of global flow-control is to replace any ad-hoc pairwise flow-control information, with global information that is transmitted as part of the strobe.

A realization of a global flow-control algorithm on-top of the fully synchronous heartbeat mechanism described in (i) above would be for each node to enumerate entries in each broadcast heartbeat, where an entry contains reception information of a process that is waiting for any incoming packets to arrive. A heartbeat (or broadcast packet) arriving at node x (receiver of the broadcast packet) from node y (sender of the broadcast packet) preferably contains a sequence of descriptors for each job on node y that is willing to receive data packets. Each descriptor contains an identifier of the receiving job, and a p element bit-mask that determines from which nodes, node y is willing to accept data packets. If node x has any data packets destined for a job on node y that has been enumerated in the heartbeat from node y, and the bit x of the bit-mask is set, then the process on node x is allowed to download data packets for node y onto the network.

On node y, the information broadcast in the heartbeat is set whenever a process blocks to receive packets. When the blocking occurs, the process sets the bits in the strobe bit-mask that determine from which nodes the job is willing to accept packets. The bit-mask is cleared whenever the receiving process has uploaded the transferred packets.

Based on only a simple bit-mask, this flow control mechanism may appear to be much more limited in scope than a method based on enumeration of message sizes. However, the strobing mechanism provides an upper bound for the buffering capacity required to store incoming packets on the receiving process, which guarantees that this simple and efficient mechanism is sufficient. Without the safeguard of the strobing mechanism, the bit-mask would have to be replaced by an explicit enumeration of the number of packets the receiver is willing to accept.

(iii) A Mechanism for Controlling the Relative Amounts of Data Transmitted by the Several Processes on One Processor.

The packets held in the staging area are held in different queues, depending upon the process which downloaded the packets. During a particular strobe, there is up to a fixed amount of data that can be transmitted onto the network (the strobing duration). As the packets have been delayed until the strobe, a scheduling algorithm can be used to determine the order, and number of a process' packets, that can be transmitted during a particular strobe.

A realization of a communications scheduling algorithm is described in the next section. This simple facility provides a handle upon which a more complex, higher-level, scheduling algorithm can control the communications requirements of a job across the whole machine.

2.2 Prioritized Communication Scheduling Algorithm

Three parameters are used to specify the characteristics of the strobing mechanism:

Strobe Gap. The time in microseconds between successive strobes, measured from the start of one strobe to the start of the next.

Strobe Duration. The maximum amount of data to be transferred in a particular strobe.

Loopback Factor. The ratio between the bandwidth of local loopback communication to the bandwidth of inter-machine communication. This value is used when the design is implemented on a symmetric multiprocessor or on a cluster of symmetric multiprocessors. It controls the rate of communication between any two processes running on the same symmetric multiprocessor node.

The injection of message packets into the low-level communication interface is controlled using a communications scheduling algorithm. The scheduling policy requires the following information to be associated with each running process:

Priority. The maximum number of bytes to be downloaded to the low-level communications system in each iteration of the prioritized scheduling algorithm.

If this parameter is small, then the interleaving of communications from different jobs is increased. If the parameter is large, then a single job may monopolize the communication in that strobe. A value which is significantly smaller than the strobe duration will normally be used by the system.

Counter. The number of credits left that can be used in the next scheduling quantum. This non-negative value will be no more than Priority.

Figure 2A:
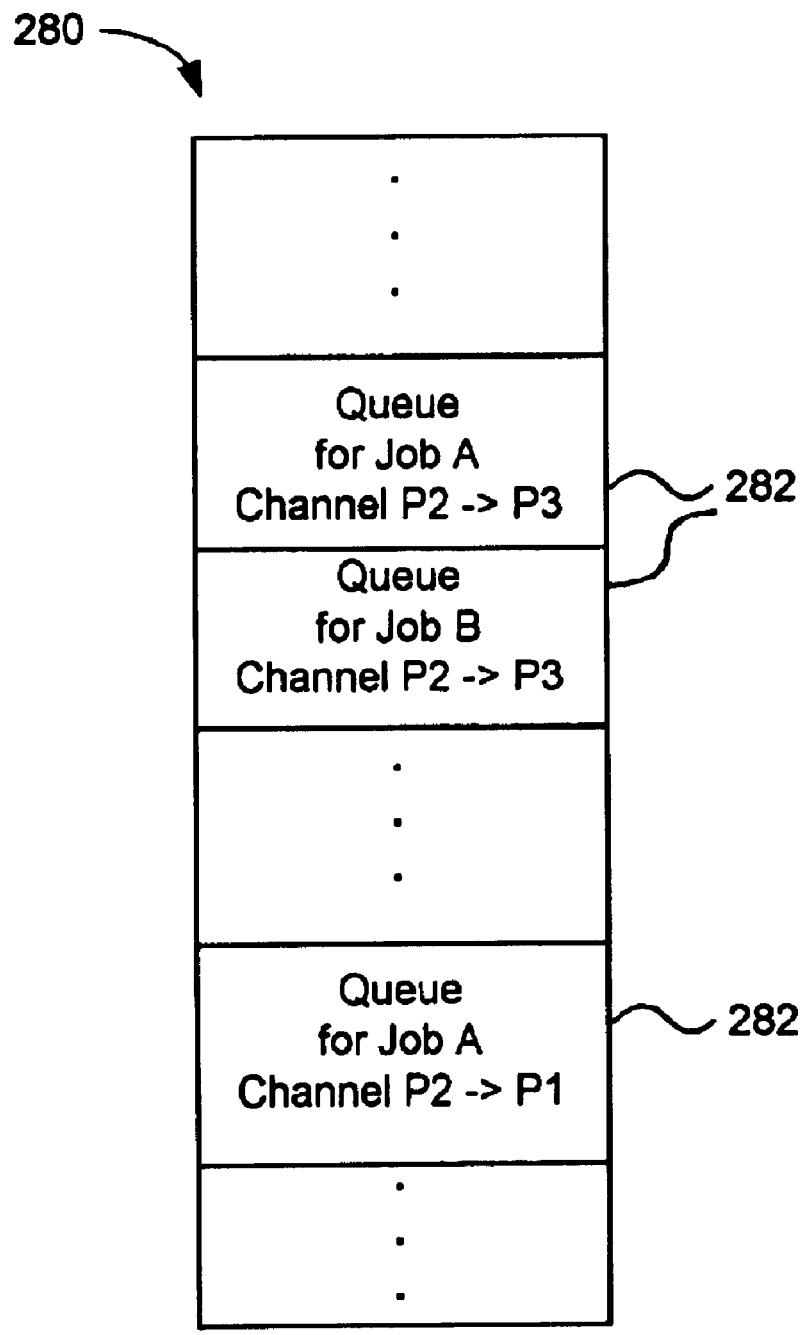
FIG. 2A is a schematic diagram illustrating a communications run queue.

The prioritized communication scheduling manipulates a communications run queue 280, illustrated in FIG. 2A. Each element of the queue 280 is itself a queue of packets 282 to be transmitted. There is a distinct queue of packets 282 for each outbound communications channel (i.e., p of them) for each job in the system. Therefore, if there are q runnable jobs on a node in the cluster of p machines, then the communications run queue can be at most of length p*q. Packet queues for, among others, jobs A, B and A, assigned to channels P2→P3, P2→P3 and P2→P1 respectively, are shown as an example.

Figure 2B:
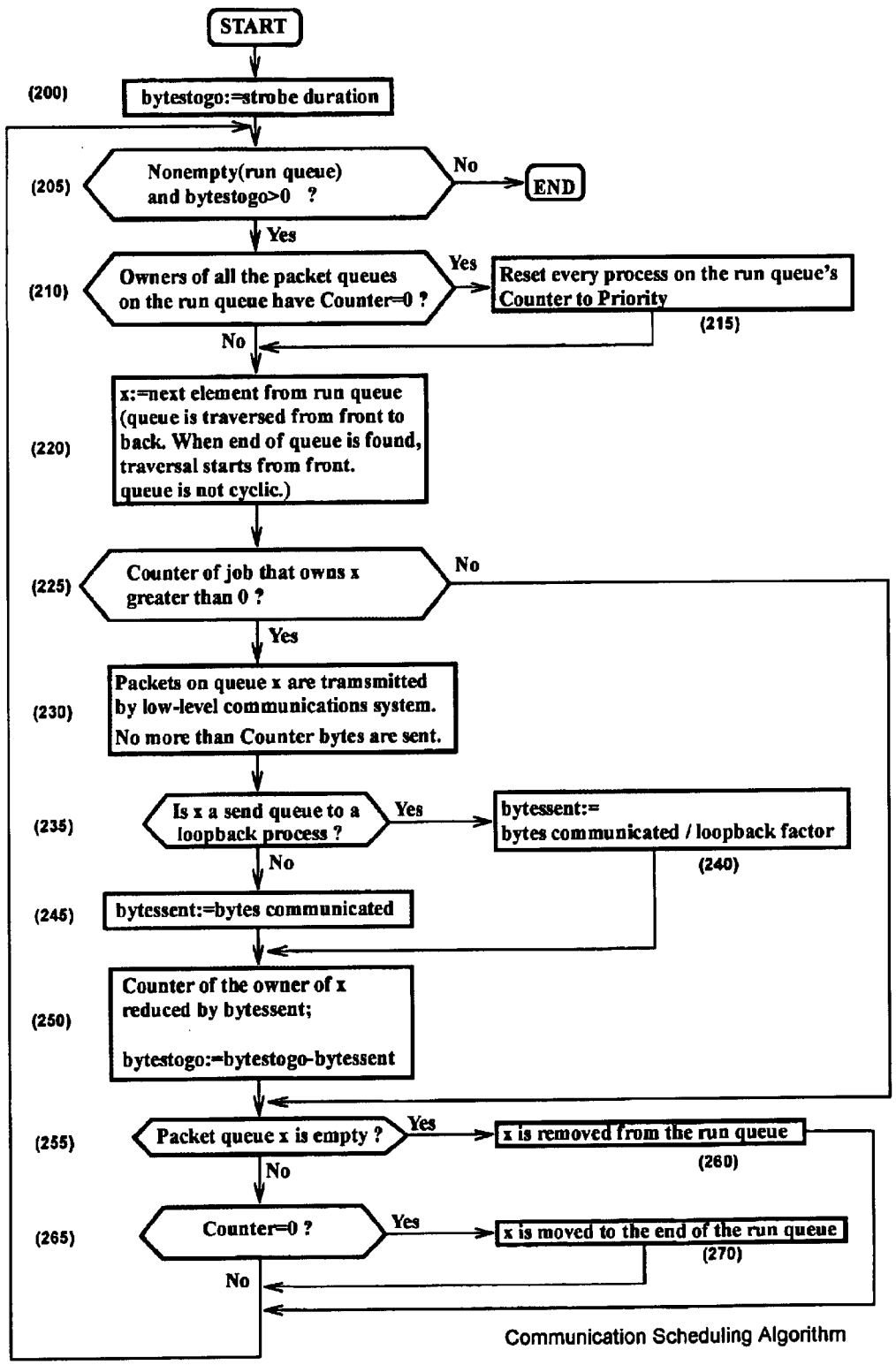
FIG. 2B is a flowchart for the algorithm used to achieve prioritized communication scheduling.
Figure 3:
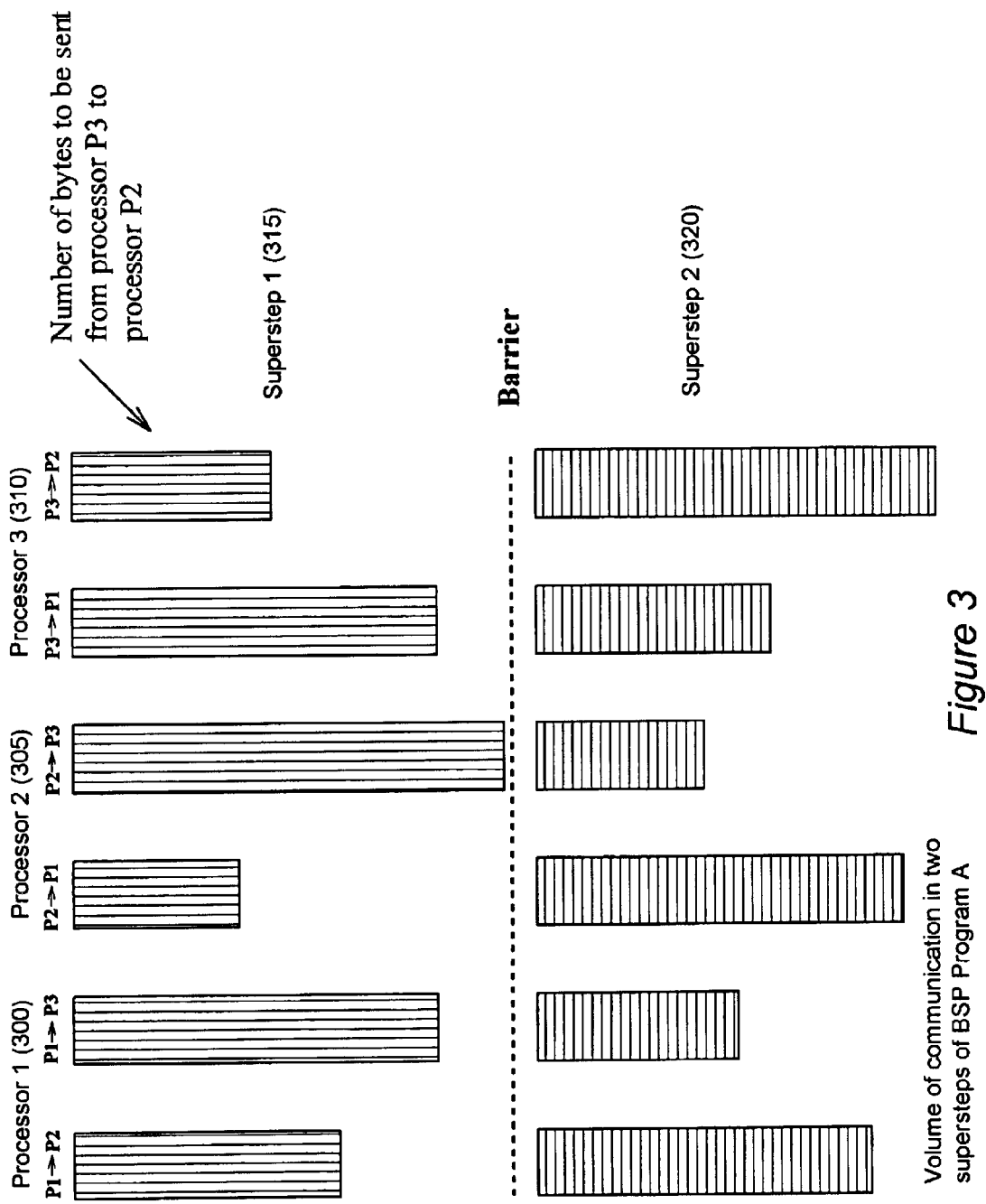
FIGS. 3 and 4 illustrate the volume of communication in two BSP programs, A and B.
Figure 4:
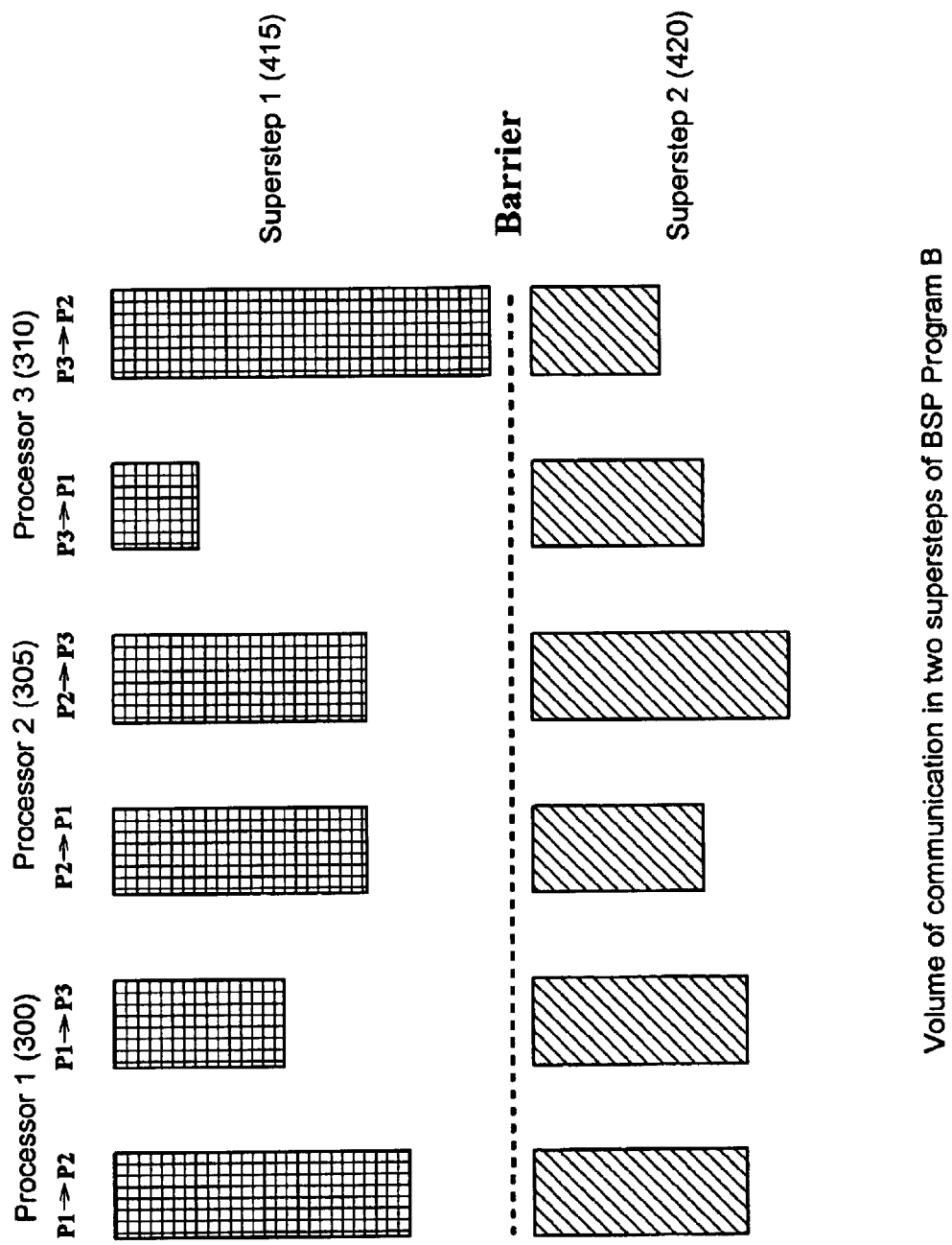

A packet queue is added to the run queue 280 at the start of the strobe if the handshaking information specified in the heartbeat broadcast matches with any local job willing to send packets. i.e., if there is a partner process willing to accept packets from a particular job. The initial ordering of the queue 280 is carefully chosen to ensure that a simple round-robin traversal of the queue 280 during a particular strobe will guarantee fairness between jobs across successive strobes, and the destination order of the outgoing packets in any particular strobe obeys an ordering, such as a Latin Square ordering, to minimize conflicts in routing through the switch. The algorithm is described in pseudo-code below, and in the form of a flowchart in FIG. 2B.

bytestogo:=strobe duration; (Step 200)
while non-empty(run queue) and bytestogo>0 do (Step 205)
   if (owners of all the packet queues on the run queue have Counter=0) (Step 210)
     then reset every process on the run queue's Counter to Priority (Step 215)
   fi
   x:=next element from the run queue; (The queue is traversed from front to the back, such that when the end of the queue is found, the traversal starts from the front-however the queue is not cyclic) (Step 220)
   if Counter of the job that owns x is greater than 0 (Step 225)
     then packets on queue x are transmitted by the low-level communications system, in such a way that no more than Counter bytes are sent; (Step 230)
     if (x is a send queue to a loopback process) (Step 235)
       then bytes sent:=bytes communicated/loopback factor; (Step 240)
       else bytes sent:=bytes communicated; (Step 245)
     fi
   Counter of the owner of x reduced by BYTEnet; (Step 250)
   bytestogo:=bytestogo−BYTEnet; (Step 250)
fi
if (packet queue x is empty) (Step 255)
   then x is removed from the run queue; (Step 260)
   else if Counter=0 (Step 265)
     then x is moved to the end of the run queue; (Step 270)
   fi
fi
endwhile FIGS. 3 and 4 provide an example showing the volume of communications in two BSP programs, Program A and Program B, each of which runs on three processors 300, 305, 310 and comprises two supersteps, 315, 320 for Program A, and 415, 420 for Program B. The vertical length of each block is proportional to the volume of communication.

Figure 5:
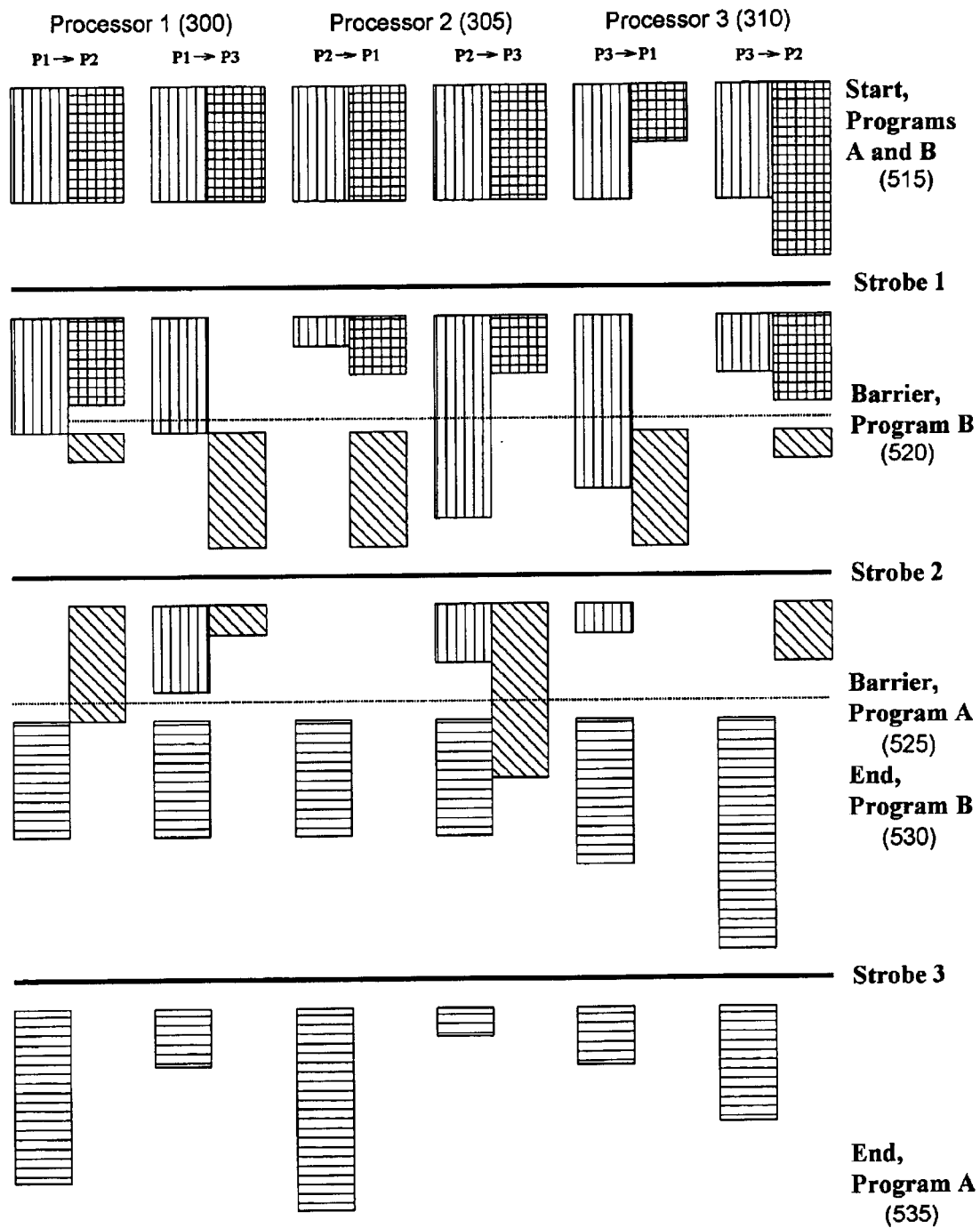
FIG. 5 describes how the prioritized communication scheduling algorithm allocates communication resources to A and B when the priorities are equal.

FIG. 5 shows the strobed scheduling of communications when each program is allocated 50% of the available communication resources. In this case, the number of bytes sent out by each processor 300, 305, 310 during a strobe is the same for each of the two programs, unless one of the processors is unable to utilize its quota during the strobe. This may, for example, be due to the program requiring little or no communication resources, or perhaps due to the fact that the program is waiting for some computation, synchronization or input/output to finish.

Note that FIG. 5 shows only the volume of communications being sent from one processor to another, i.e., the volume downloaded. It does not show the volume of communications being received by a processor, i.e., the volume uploaded. The strobing mechanism tightly and globally controls the downloading of packets. In certain cases it may also control the uploading of packets, but this is not essential.

Note that the second superstep of Program B starts and finishes (520, 530) one strobe before the second superstep of Program A (525, 535). Note also that, in general, communications from one node from two successive supersteps of a program may be handled in the same strobe.

This arises when:
(a) The prioritized communication scheduling algorithm, which transmits packets to the low-level communications system, is non-atomic, as is implicit in the example illustrated in FIG. 5, and runs concurrently with user processes which may be downloading and uploading data; and when
(b) Within a single strobe, the user's BSP program, at one node:
Finishes downloading the last packets from superstep t;
Uploads all outstanding packets from superstep t (including all barrier synchronisation packets); and
Starts downloading the first packets from superstep t+1.

This shows very clearly that the rate of the periodic strobing barrier mechanism of the system is quite distinct from the synchronisation mechanisms used by the various types of programs which may be running on the multiprogrammed system.

Figure 6:
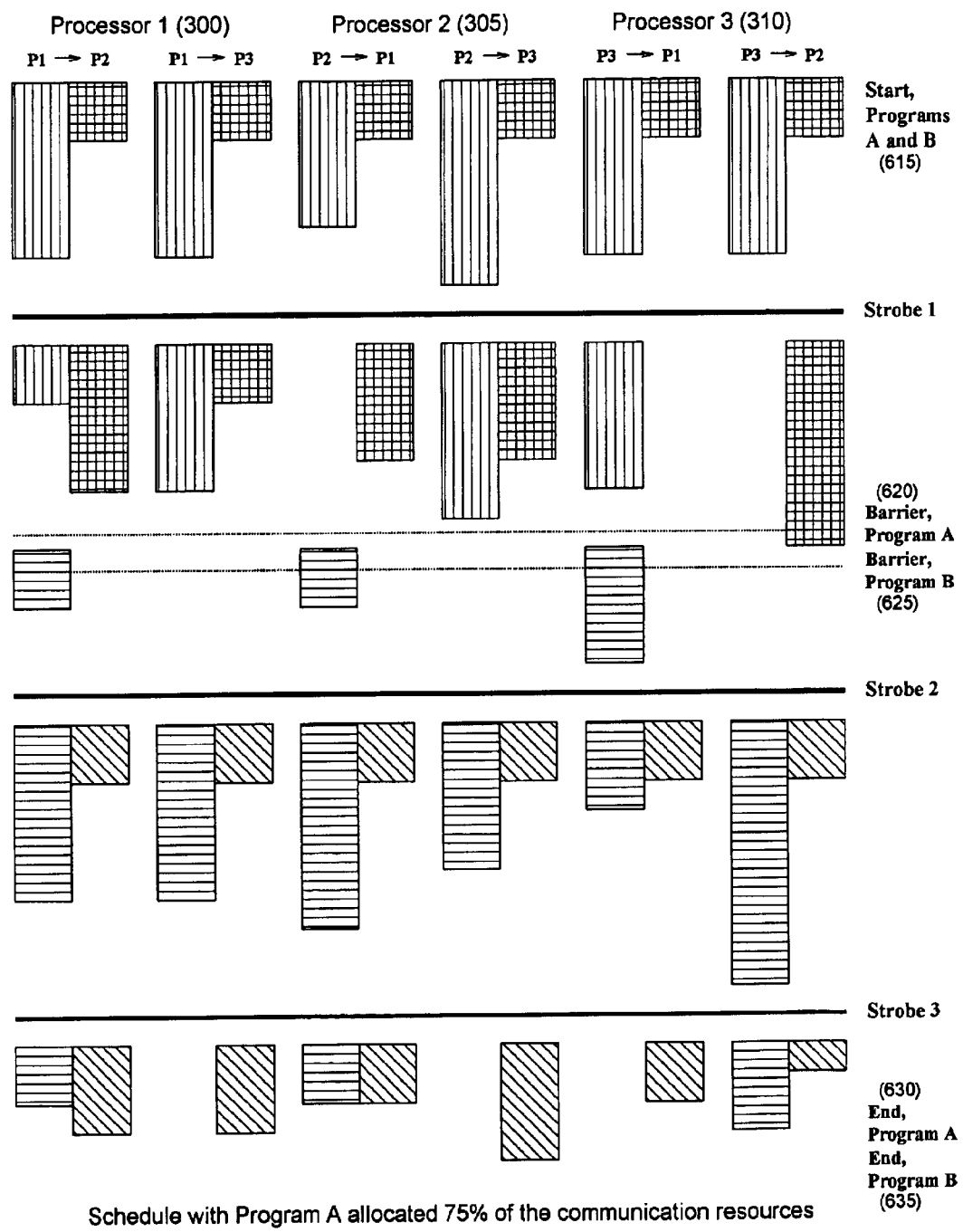
FIG. 6 describes how the prioritized communication scheduling algorithm allocates communication resources to A and B when program A has a higher priority than Program B.

Given the greater communication requirements of Program A, it may be appropriate to allocate to it a greater proportion of the communication resources available. FIG. 6 shows the strobed scheduling of communications when Program A is allocated 75% of the available communication resources. In this case, the number of bytes sent out by a processor during a strobe is three times greater for Program A than for Program B. As in the previous case, this will vary if one of the two programs is unable to utilize its quota for the strobe.

The parts of the preferred embodiment described in sections 2.1 and 2.2 are applicable to clusters, SMPs, and clusters of SMPs. The key to its applicability is the delaying of communications within a staging area. For a cluster of SMPs, many processors can concurrently enqueue data into the staging area. However, the downloading of packets by the strobe is controlled by a single processor to ensure correct scheduling and global flow control of the communication. Similarly, the mechanism is applicable to a single SMP, the only difference from a cluster of SMPs being that instead of downloading a packet onto a network interface card for transmission across the network, the packet is placed directly onto a corresponding receive queue within the same machine.

The present invention is neutral with respect to the choice of network, network interface card, and operating system, although a particular implementation may utilize specialised characteristics of a particular operating system, network or network interface card. For example, the strobing heartbeat can be efficiently implemented using the broadcast facilities within Ethernet. The mechanism is also neutral with respect to the various standard input/output subsystems used in high performance architectures, such as RAID and Storage Area Networks.

The use of strobing to manage and control communications provides the following new features in a multiprocessor system:

high throughput for multiple programs;
dynamic user control of communication priorities;
close coupling to high level job schedulers; and
protection against jobs with excessive resource consumption, whether accidental or malicious.

It also provides an effective and efficient means of achieving system fault tolerance, as the heartbeat mechanism will detect any processor which enters or leaves the system.

2.3 Communication Layers

Figure 7:
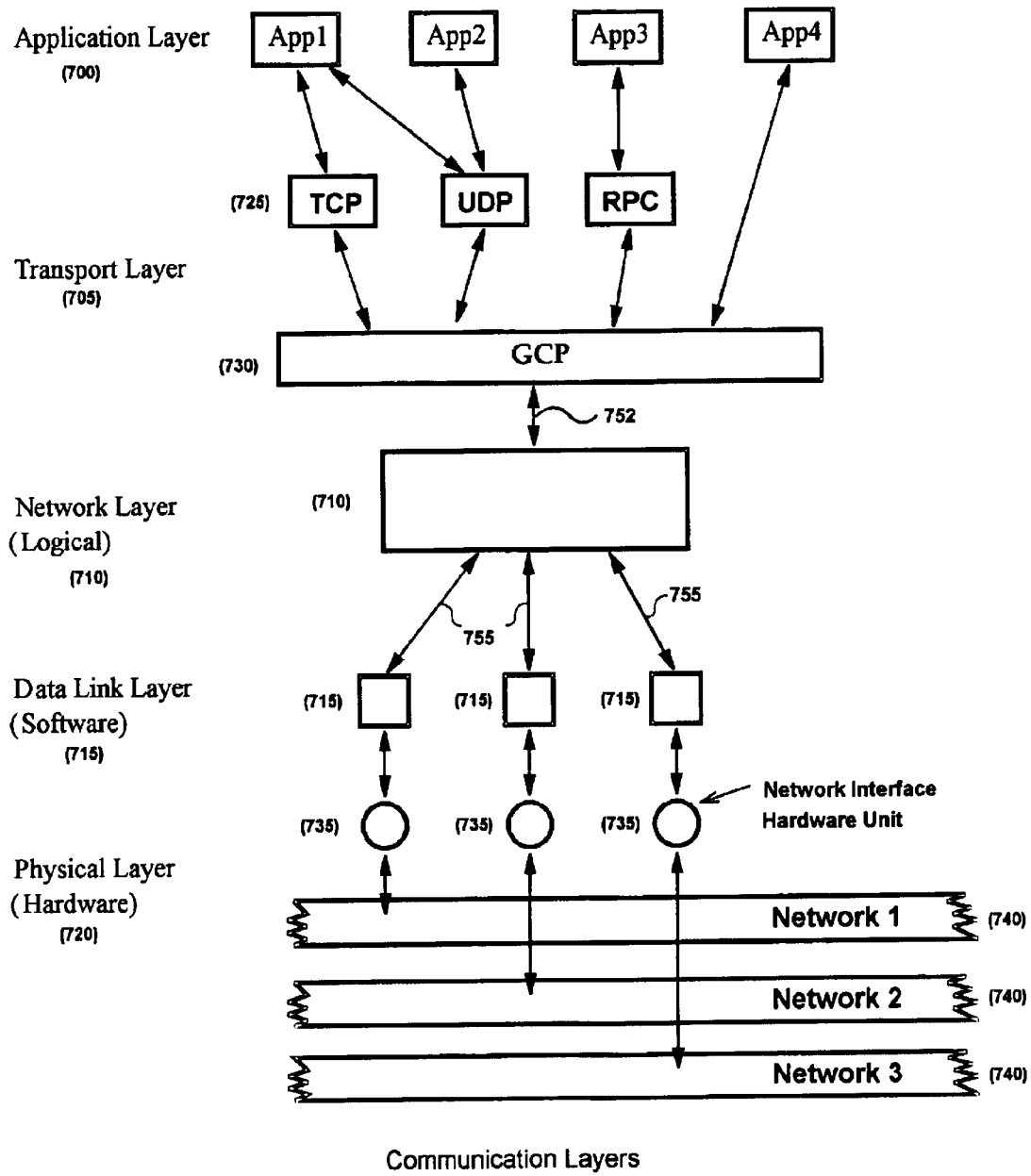
FIG. 7 shows the new five-layer communication model of the present invention, consisting of Application Layer, Transport Layer, Network Layer, Data Link Layer and Physical Layer.
Figure 8:
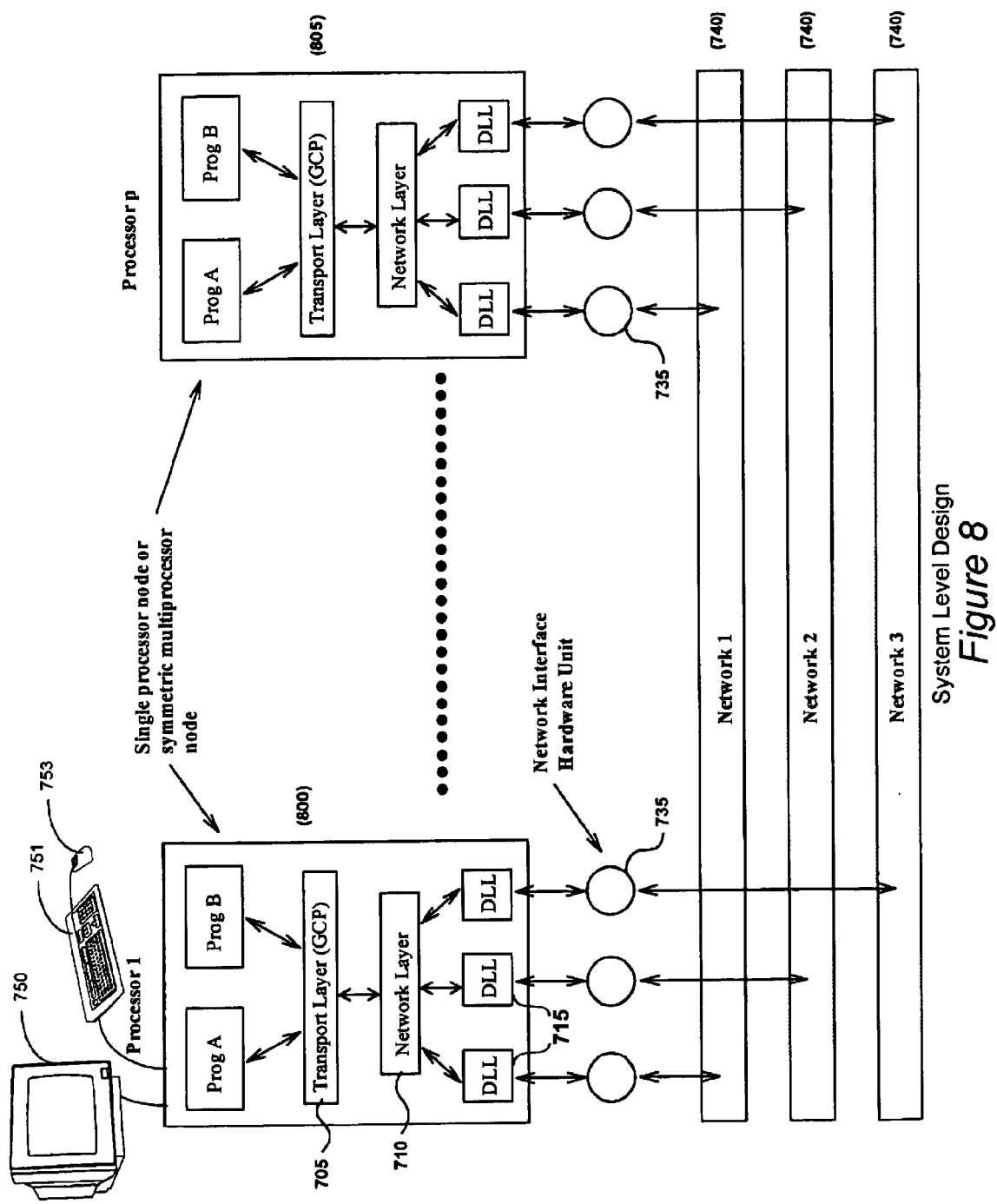
FIG. 8 describes the overall system level design which consists of (a) a plurality of nodes, each of which is a single processor system or a symmetric multiprocessor, (b) a plurality of network interface hardware units, and (c) a plurality of networks.

The organization of communications in the design is based on a new five-layer communication model, which differs significantly from the standard OSI seven-layer reference model [18]. The layers in the new design are not simply a collapsed and renamed variant of the Open Systems Interconnection (OSI) model. They have a quite distinct and unique organisation and functionality. An outline of the five layers 700, 705, 710, 715, 720 is shown in FIG. 7. The overall system level design is outlined in FIG. 8. It consists of (a) a plurality of nodes, each of which is a single processor system or a symmetric multiprocessor 800, 805, (b) a plurality of network interface hardware units 735, and (c) a plurality of networks 740.

At the level of the Application Layer 700, programs communicate using some communication library, messaging interface or middleware system (for example IP, TCP/IP, UDP/EP, BSPlib, MPI, PVM, VIA RPC, CORBA, MQ Series).

The Transport Layer 705 contains two components (i) "interfaces" to existing standard transport layer protocols such as TCP/IP, UDP/IP, RPC, BSPlib (725), (ii) a new Global Control Protocol (GCP) 730 which these standard protocols are built upon. GCP is the single interface to the strobing mechanism described in section 2.1. The strobing mechanism behind the GCP interface uses a network-layer interface that provides reliable, ordered delivery of datagrams.

A standard implementation of a reliable transport layer such as TCP would normally assume an unreliable network layer. Therefore, a transport layer must keep transmitted data on send queues, for possible retransmission. The transmitted data needs to be held on these queues until explicitly acknowledged by the peer transport entity.

A limitation of this design is that different reliable transport layers must reimplement message reliability. This is both cumbersome and inefficient, since two distinct transport layers cannot share reliability information. This information is deduced from control packets sent by the transport layer, which may duplicate the error recovery process.

The new design of the present invention pushes the error recovery process down into the Network Layer 710. This means that error recovery is performed exactly once, thus limiting the amount of control information, such as explicit acknowledgement packets, which needs to be communicated. By closely coupling the global properties of the Transport Layer 705 with the Network Layer 710, we can move global implicit acknowledgements into this lower layer 710, which further reduces the amount of control communication packets.

Although the GCP Transport Layer 705 multiplexes data in a strictly controlled manner, there are opportunities for optimizing the single stream of packets 752 that are pushed into the Network Layer 710. For example, the Network Layer 710 may demultiplex this single stream 752 into a fixed number of streams 755 which are passed to the Data Link Layer 715, which communicates them over a plurality of independent networks 740 to their destination. As it is the Data Link Layer 715 that performs error recovery in this design, it is able to perform error recovery independently on each of the independent physical networks.

There are a number of advantages in using separate networks, or viewing a single physical network as separate networks. Errors detected in one physical network may not be experienced in another physical network. This means that lost traffic may be localized to a particular physical network attached to one of the network interface hardware units on a processor. By providing the recovery mechanism below the level of the multiplexing onto the network, the recovery mechanism can exactly circumscribe the unreliable component, and has the advantage of only recovering data on the physical network that fails. This is achieved by executing the recovery protocol over each of the circuits at the Data Link Layer level 715. These circuits may be realized over either physically or logically separate networks.

The Physical (Hardware) Layer 720 of the design contains one or more independent physical networks 740 and network interface hardware units 735 for communication. By using multiple networks one can achieve higher performance and a greater degree of fault tolerance.

These parts of the present invention are applicable to clusters and clusters of SMPs. As with the strobing mechanism, this communication mechanism is neutral with respect to the choice of network, network interface card, and operating system.

2.4. Summary of Global Control Techniques

The following points summarize the new global control techniques which are used in this multiprogrammed design, and, where appropriate, how they relate to methods used for single programs.

Packet injection using periodic strobing. This is a new design technique for batch communication, and is fully described above in section 2.1.

Packet injection using global flow control. This is a new design technique for batch communication, and is fully described above in section 2.1 (ii).

Global implicit acknowledgements. The structure of a BSP computation allows an implementation to avoid sending unnecessary acknowledgements in certain cases. Suppose that the packets from one superstep are colored red, and those of the next superstep are colored green. If processor i has sent red packets to processor j which are currently unacknowledged, and processor i receives a green packet from processor k, then it knows that all processors must have (logically) passed through a global barrier synchronisation, and it can regard all red packets as implicitly acknowledged. In a single program BSP design, the use of global implicit acknowledgements may decrease the number of explicit acknowledgement packets required for the program. In the new multiprogrammed design of the present invention, a BSP program can be run concurrently with other types of programs. If the BSP program occupies every node in the system, then, since the Network Layer 710 (FIG. 7) preserves packet ordering, that BSP program can be used to perform global implicit acknowledgements for the data packets from that program, as well as all other programs (BSP and non-BSP) running on the system. To ensure that global implicit acknowledgements are performed at regular intervals, the new multiprogrammed design runs a BSP control program which performs barrier synchronisations at the desired frequency.

Error recovery. By performing recovery at the lowest possible level in the protocol stack, the overheads in recovery can be amortized over all jobs communicating from a node. This is in contrast to traditional pairwise error recovery which performs independent recovery between each pair of communicating processes.

Destination scheduling. The order in which messages are sent is globally managed and controlled in order to avoid contention at the destination nodes. The global control is non-oblivious, i.e., the scheduling strategy is dynamically determined by the system, taking account of the particular structure of the communication pattern to be realised. In a single program BSP design, this information is determined from data sent during the BSP barrier synchronisation. In the new multiprogrammed design of the present invention, destination scheduling is performed as part of the strobing and the prioritized communication scheduling, which means that all types of programs benefit from this global optimisation. The pseudo-code in section 2.2 and the flowchart in FIG. 2 show how the contents of the run queue are scheduled. The creation of this run queue is performed as follows. The global flow control algorithm of section 2.1 (ii) is used to filter those send queues that have partner processes that are ready to receive. The filtered queues can then be arranged in an appropriate order. The order is determined in a distributed and dynamic way from the information communicated in the heartbeat of the strobe. For example, FIG. 1 illustrates the so-called Latin square method where at stage k, the in processor from among processors 1, 2, ..., p sends information to processor 1+((i+p−k) mod p). Thus the sequence of destinations shifts by one at each stage. An effective general method of destination scheduling is to perform a similar cyclic shifting process to the set of filtered queues in each strobe. In successive strobes, the ordering of the various queues undergoes further shifting relative to each other.

Pacing. The injection of new messages into the network is globally controlled to ensure that the total applied load is maximized, but that it does not exceed the level at which network throughput will start to decrease. As with destination scheduling, a non-oblivious method is used to minimise contention. Unlike the single program BSP design which paces messages on a superstep by superstep basis, this new multiprogrammed design paces all messages (from any type of program) by controlling the strobe duration and gap.

Prioritized communication scheduling. This is a new design technique, and is fully described above in section 2.2.

2.5. Generic Parallel Job Signatures

The concise, accurate signatures used in single program BSP computing are achievable due to the fact that BSP programs use global barrier synchronizations. In the context of a single parallel program, it is difficult to extend the idea of a concise job signature to non-BSP programs, which use only local pairwise synchronisations. The multiprogrammed design presented here does, however, allow this to be achieved.

Extending the approach used in single program BSP computing, we can provide every parallel program (BSPlib, MPI, PVM, TCP/IP, UDP/IP, IP, RPC, CORBA etc.) with an accurate "job signature" of the form (W,H,M,S) where W=maximum local computation and input/output performed by any one processor;

H=maximum number of bytes sent or received by any one processor;

M=maximum memory required by any one processor; and

S=maximum number of blocking receives performed by any one processor.

This generic parallel job signature provides a concise characterisation of the local computation and input/output, communication, memory, and synchronization resources required by the job, when run on the MBSP multiprogrammed system. One important difference between this new form of job signature is that, unlike standard BSP signatures, we measure communication cost by taking the maximum number of bytes sent or received by any one processor, rather than the sum of the communication costs for each individual superstep. For a single program, this new communication cost is too low in many cases. However, on an MBSP system running a number of programs concurrently, the new cost provides a more accurate value for the strobing-based communication scheduling algorithm used in this design.

In certain situations, it may be appropriate to have a more detailed job signature. In such cases, we can, for example, use an extended job signature of the form (eW,eH,eM,eS) where each one of the four components consists of p values:

eW=[w:1,w:2, ..., w:p] where w:i=local computation and input/output performed by processor i;

eH=[h:1,h:2, ..., h:p] where h:i=number of bytes sent or received by processor i;

eM=[m:1,m:2, ..., m:p] where m:i=memory required by processor i; and eS=[s:1,s:2, ..., s:p] where s:i=number of blocking receives performed by processor i.

With generic parallel job signatures, we can precisely and flexibly control the high level task scheduling in our system, enabling the system to offer a completely new and powerful form of service level management.

2.6. Service Level Management

Globally controlled communications together with machine and job signatures make it possible to offer both application users as well as systems administrators a broad range of new options with regard to service levels, that was not possible before in multiprocessor systems.

The system provides a universal, high-level control mechanism for a signature-driven task scheduler. The control mechanism uses a static or dynamic protocol between the task scheduler and an application agent to determine the quality of service to be provided to an application task when it is run on the system. This flexible and dynamic control mechanism enables individual application tasks, and the system as a whole, to achieve guaranteed quality of service across the whole range of service characteristics, including the ability to guarantee application deadlines, real-time and interactive response, absolute and relative priorities, application cost, or maximal system throughput. It enables the system to offer a wide variety of service level options that are each determined by a specification of a combination of these characteristics.

The system maintains a global view of all the jobs running on the system and allocates jobs to ensure the best use of the system's resources. Machine and job signatures are used to determine the high level allocation of resources to the various jobs, and to adjust the priorities used by a low-level deadline scheduler which controls the jobs that are currently running.

To achieve maximum dynamic flexibility, the scheduler can partition the resources into reserved and unreserved groups. Reserved resources can be booked by users who require a guaranteed and fixed level of service. Unreserved resources are made available in accordance with some competitive or market mechanism.

Jobs are classified as (a) interactive, or continuously running, in some time interval, or (b) batch, with some deadline.

Service levels can be guaranteed or variable. Pricing and other priority mechanisms can be based on fixed price service level agreements or on market mechanisms. When market mechanisms are used it is possible for the resources allocated to a job to be fixed and the price to depend on the demands or willingness to pay by other users, and equally for the price to be fixed and the resources allocated to depend on the other users.

Interactive software tools, i.e., a user interface accessed, for example, with a monitor 750, keyboard 751 and mouse 753 (FIG. 8) can be used to submit jobs, provide job signatures, and to negotiate service level agreements. This user interface may be run on one or several of the processors executing the tasks, or alternatively, on a different processor. The tools may also be used, for example, to inspect the state and output of jobs, to flexibly and dynamically renegotiate service level agreements for a currently running job, and to take account of revised deadlines, unanticipated increases or decreases in the system load, or some other change. In this way, a user can achieve tight control of performance and cost, by allowing the deadline of a job to be changed dynamically.

The functionality and parameters of the system, such as the division of resources into reserved and unreserved, can be controlled by the system manager using software tools. The system manager can also set the default resource allocations and service levels to be provided to jobs which do not specify those requirements.

The system provides detailed dynamic monitoring and reporting facilities, which describe the previous, current and projected resource usage for each job. This can be used to verify that the quality of service provided is consistent with the guarantees in the service level agreement, and to provide detailed and accurate usage-based billing facilities to the users of the system.

2.7 Job Contracts

Figure 9A:
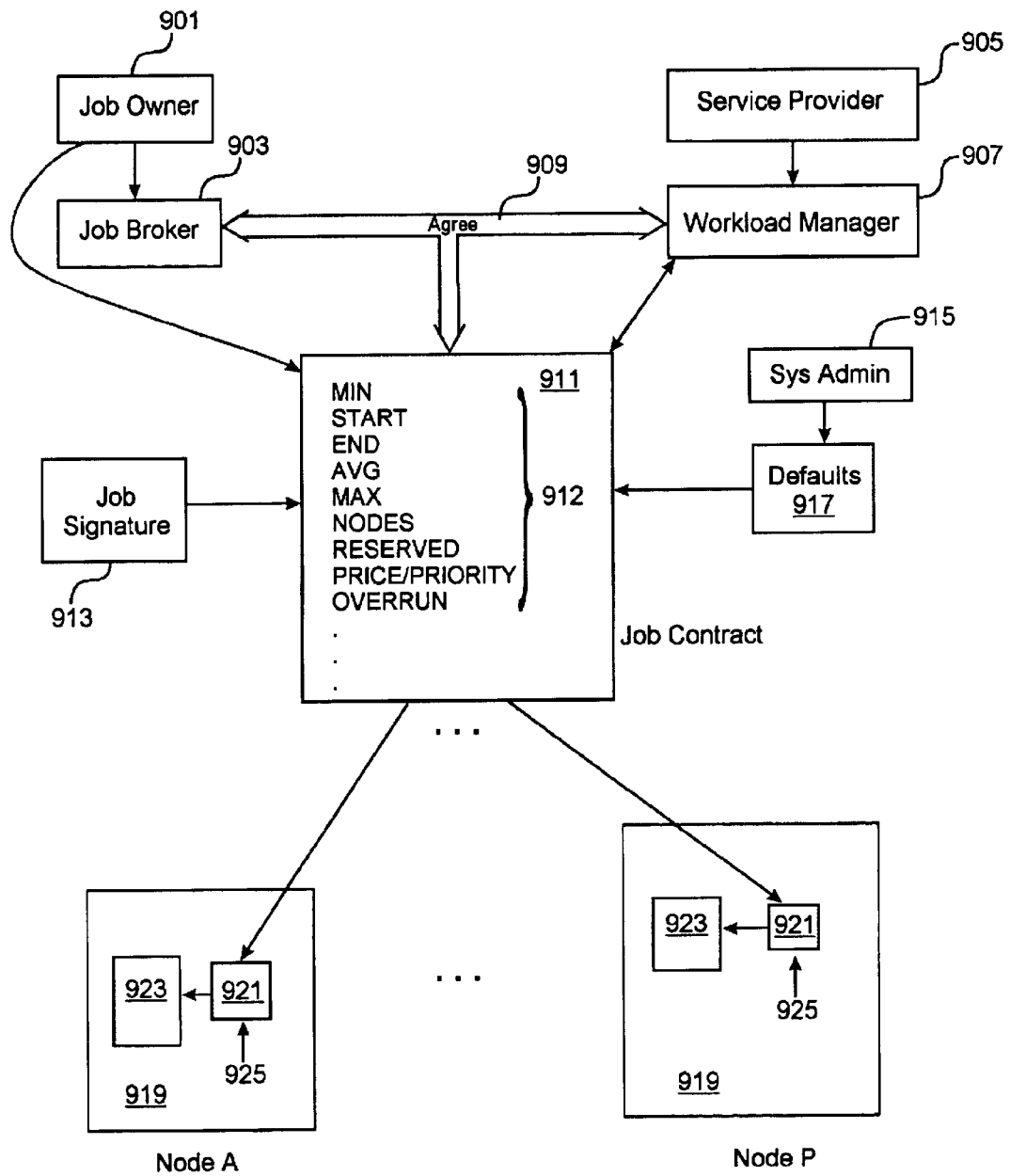
FIG. 9A is a block diagram illustrating the generation and function of a job contract in the present invention.

As FIG. 9A illustrates, the acceptance of a job on the system is preceded by the generation of a contract 911 specifying the service level options and conditions under which the job will be run. Details such as the start and end times for the job, and the average level of service provided by the system are included in the job contract, and are binding for both the job owner 901 and the service provider 905. As a result, the software that manages the system resources can discontinue or terminate jobs that do not comply with their contracts, and which would thus jeopardize its ability to provide the promised level of service to other jobs. At the same time, job owners can claim compensation when their jobs are not allocated the amount of resources specified in the associated job contracts. In this section, we give examples of the types of job contracts that are supported by the present invention. The present invention also supports a wide class of related types of contracts.

Following the submission of a job to the system, a contract 911 stipulating the terms under which the job will run is agreed upon, as represented by 909, between the Job Broker 903—on behalf of the job owner 901, and the Workload Manager 907—on behalf of the service provider 905. The various parameters of this contract can be (a) provided by the job owner 901, (b) extracted from the job signature 913 maintained by the system, (c) set to default values 917 chosen by the systems administrator 915, or (d) computed by the Workload Manager 907 based on the other parameters and on workload of the system.

Once a job contract is accepted by the Workload Manager 907, a low level scheduler 921, which runs on every node, or processor, 919 (corresponding to processors 800, 805, etc., of FIG. 8) of the system, ensures that the system fulfils its contractual obligations. This scheduler 921 is termed the Deadline Scheduler. A list 923 of jobs and job priorities is maintained on each node 919. The Deadline Scheduler 921 achieves its objective by regularly adjusting the priorities of the jobs executing on the local node. The time interval between two successive executions of the Deadline Scheduler is called a time slot, which is initiated by a time slot control 925, such as a timer.

A Job Contract 911 may include clauses establishing the following characteristics 912 of the job (some of which may be set to default values):

MIN: The minimum level of service for the job, giving the minimum amount of resources allocated to the job per time slot. Typically, the minimum level of service is zero for a batch job, and has a positive value for interactive jobs.

START, END: The period covered by the job contract.

AVG: The average amount of resources provided to the job.

MAX: The maximum amount of resources the job is willing to accept per time slot throughout its execution.

NODES: The number of nodes required to run the job, and the identifiers of those nodes.

RESERVED: Whether the job is executed using resources reserved for the exclusive use of the job owner (or of his/her user group) or not.

PRICE/PRIORITY: The cost of running the job (when not provided by the job owner, this field of the contract is filled in either at job submission time or after job completion), or the priority of the job (for jobs run on reserved resources).

OVERRUN: Action to be taken if the resources initially claimed for the job are insufficient.

According to how the above set of parameters are established, job contracts can be classified into default contracts, price/priority-driven contracts, and requirements-driven contracts.

A default contract is issued for (a) jobs that are submitted without using a Job Broker (note that the systems administrator can disable the option to start jobs in this way) and (b) jobs that are brokered without any explicit parameters.

In the case of price/priority driven contracts, the job owner chooses a price or priority, and the contract is then generated based on this price or priority. Note that—as in a real market—users may employ sophisticated brokers to anticipate the level of service their jobs will get for the chosen price/priority.

Unless specifically restricted by the systems administrator, any user may (a) pre-book system resources for his/her exclusive use, (b) request guaranteed resources for a job, and (c) use resources reserved for his/her user group. When submitting a job that will be allocated such resources, the user is allowed to specify absolute requirements for the job. A requirements-driven job contract is then agreed between the Job Broker and Workload Manager.

Figure 9B:
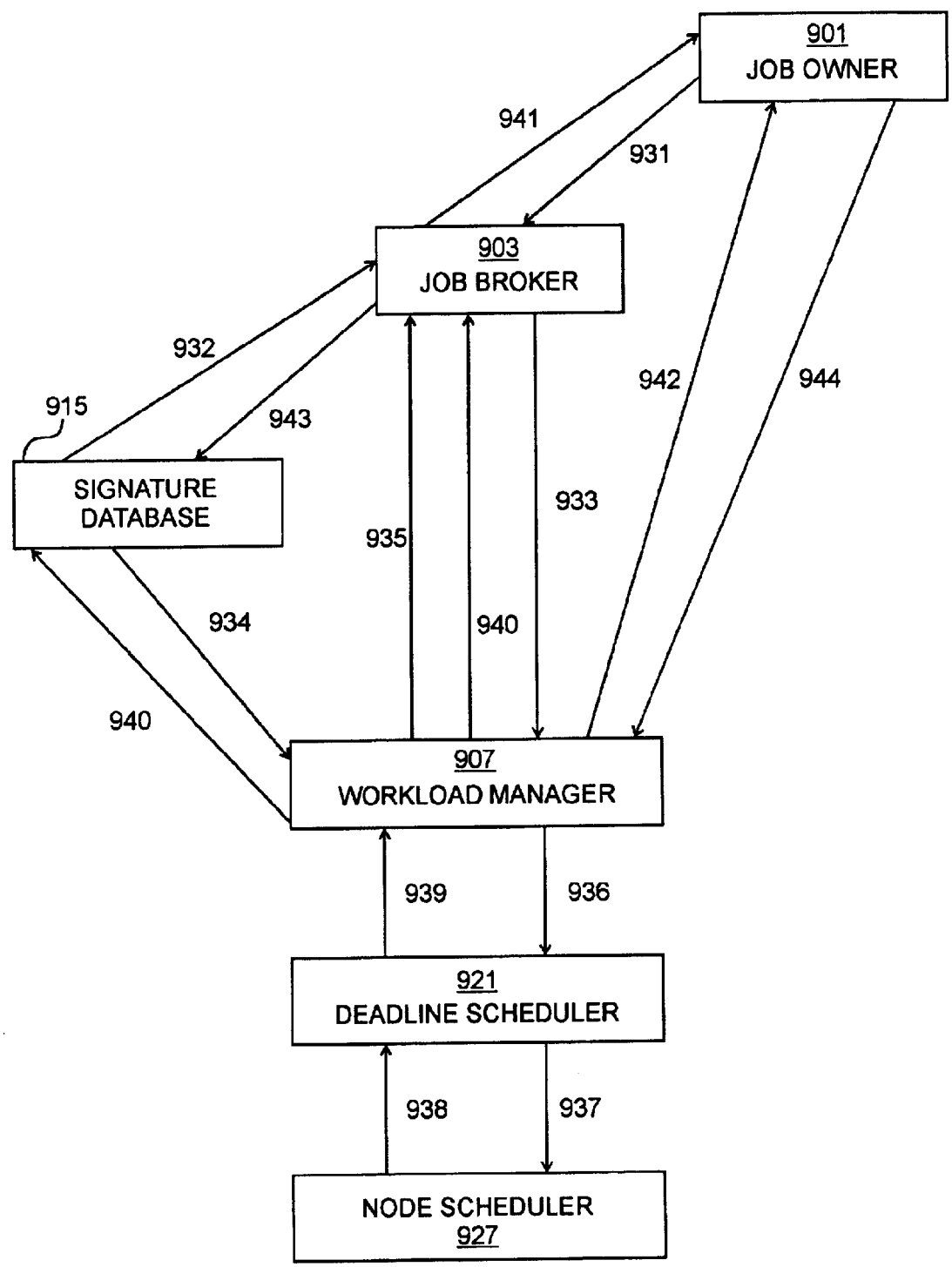
FIG. 9B is a schematic diagram illustrating in more detail than FIG. 9A the various interactions which may take place during service level management and job contract negotiation.

FIG. 9B illustrates in more detail the various interactions which may take place during service level management and job contract negotiation. At Step 931, the Job Owner 901 supplies initial or modified requirements, e.g., resources, deadline, price, priority, overrun, to the Job Broker 903. At Step 932, the Job Broker 903 retrieves the job signature 913 from the Signature Database 915.

At Step 933, the Job Broker 903 supplies the initial or modified requirements to the Workload Manager 907. The Workload Manager then retrieves the job signature 913 from the Signature Database 915 (Step 934), and supplies information on current resource availablity and pricing to the Job Broker 903 (Step 935).

At Step 936, the Workload Manager supplies the initial or revised job contract 911 (FIG. 9A), or service level agreement, to the Deadline Scheduler 921, which in turn supplies the initial or revised priority of the job to the Node Scheduler 927 (Step 937). The Node Scheduler 927, at Step 938, reports job progress to the Deadline Scheduler 921. The Deadline Scheduler 921, reports job progress to the Workload Manager 907, at Step 939.

At Step 940, the Workload Manager 907 reports service level agreement status to the Job Broker 903, and records the information in the Signature Database 915. At Step 941, the Job Broker 903 reports service level agreement status to the Job Owner 901.

The Workload Manager 907 supplies a report and a bill to the Job Owner for resources used for the job (Step 942).

At Step 943, the Job Broker 903 records the job signature information in the Signature Database.

If permitted by the system administrator, the Job Owner 901 may provide a default submission directly to the Workload Manager 907, as shown at Step 944.

While this invention has been particularly shown and described with references to preferred embodiments thereof, it will be understood by those skilled in the art that various changes in form and details may be made therein without departing from the spirit and scope of the invention as defined by the appended claims.

REFERENCES

[1] B N Chun, A M Mainwaring and D E Culler. *Virtual Network Transport Protocols for Myrinet*. IEEE Micro, January–February 1998, 53–63.

[2] G Ciaccio. *Optimal communication performance on Fast Ethernet with GAMMA*. Proc. Workshop PC-NOW, IPPS/SPDP'98, LNCS Vol. 1388, 534–548, Springer 1998.

[31] D E Culler, J P Singh and A Gupta. *Parallel Computer Architecture: A Hardware/Software Approach*. Morgan Kaufmann (1999)

[4] S R Donaldson, J M D Hill and D B Skillicorn. *Exploiting global structure for performance on clusters*. Proc. IPPS/SPDP 1999, San Juan, Puerto Rico, April 1999.

[5] S R Donaldson, J M D. Hill and D B Skillicorn. *Performance results of a reliable low-latency communication protocol for clusters*. Proc. PC-NOW '99: International Workshop on Personal Computer Based Networks Of Workstations, held in conjunction with IPPS/SPDP 1999, San Juan, Puerto Rico, April 1999.

[6] S R Donaldson, J M D Hill and D B Skillicorn. *Predictable Communication on Unpredictable Networks: Implementing BSP over TCP/IP*. Proc. EuroPar'98, LNCS Vol. 1470, 970–980 Springer-Verlag, September 1998.

[7] A V Gerbessiotis and L G Valiant. *Direct Bulk-Synchronous Parallel Algorithms*. Journal of Parallel and Distributed Computing, Vol. 22, No. 2, August 1994, 251–267.

[8] M. W. Goudreau, K. J. Lang, S. B. Rao, T. Suel and T. Tsantilas. *Towards efficiency and portability: Programming the BSP model*. Proc. 8th ACM Symposium on Parallel Algorithms and Architectures, June 1996, pp 1–12. (Submitted to IEEE Transactions on Computers "Portable and Efficient Parallel Computing Using the BSP Model").

[9] M W Goudreau and S B Rao. *Single-message vs. batch communication*. In Algorithms for Parallel Processing, Vol. 105 of IMA Volumes in Mathematics and Applications, edited by M. T. Heath, A. Ranade, and R. S. Schreiber, Springer-Verlag, pp. 61–74, 1998.

[10] J M D Hill and B McColl and D C Stefanescu and M W Goudreau and K Lang and S B Rao and T Suel and T Tsantilas and R H Bisseling. *BSPlib: The BSP Programming Library*. Parallel Computing, Vol. 24, No. 14 (1998) pp. 1947–1980.

[11] J M D Hill and D B Skillicorn. *Lessons learned from implementing BSP*. Future Generation Computer Systems, Vol 13, No 4–5, pages 327–335, March 1998.

[12] J P Jones and C Brickell. *Second Evaluation of Job Queueing/Scheduling Software: Phase 1 Report*. NAS Technical Report NAS-97-013 (June 1997) NAS High Performance Processing Group, NASA Ames Research Center, Mail Stop 258-6, Moffett Field, Calif. 94035–1000

[13] W F McColl. *Foundations of Time-Critical Scalable Computing*. Proc. 15th IFIP World Computer Congress (Fundamentals—Foundations of Computer Science), Aug. 31 Sep. 4, 1998, Vienna and Budapest, K Mehlhorn (editor), 93–107.

[14] S Pakin, V Karamcheti and A A Chien. *Fast Messages: Efficient, portable communication for workstation clusters and MPPs*. IEEE Concurrency, 5(2), 60–73, April–June 1997.

[15] G F Pfister. *In Search of Clusters, Second Edition*. Prentice-Hall (1998)

[16] L Prylli and B Tourancheau. *A new protocol designed for high performance networking on Myrinet*. Proc. Workshop PC-NOW, IPPS/SPDP'98, LNCS Vol. 1388, 472–485, Springer 1998.

[17] D B Skillicorn, J M D Hill and W F McColl. *Questions and answers about BSP*. Journal of Scientific Programming, Vol. 6, No. 3, Fall 1997, 249–274.

[18] A S Tanenbaum. *Computer Networks. Second Edition*. Prentice-Hall (1989)

[19] L G Valiant. *A Bridging Model for Parallel Computation*. CACM, Vol.33, No.8, 1990,103–111.

[20] T von Eicken and W Vogels. *Evolution of the Virtual Interface Architecture*. IEEE Computer, Nov 1998, 61–68.

[21] M Welsh, A Basu and T von Eicken. *Low-latency communication over Fast Ethernet*. Proc. EuroPar '96, LNCS Vol. 1123, 187–194, Springer 1996.

What is claimed is:

1. A method for scheduling a plurality of tasks on a multi-processor system to allocate resources of the multi-processor system to the plurality of tasks, the method comprising:

determining a machine signature characterizing computation and communication resources of the multi-processor system;

generating a task signature for at least some of the plurality of tasks running on the multi-processor system, each task signature characterizing communication and computation resources required by a particular task;

scheduling the plurality of tasks on the multi-processor system based at least in part, on the task signatures and the machine signature, for allocating resources of the multi-processor system to the plurality of tasks, wherein said scheduling includes establishing a strobing interval comprising a period of time between successive strobes in which communications are transmitted and establishing a strobing duration comprising a maximum volume of data that may be communicated in a particular strobe; and controlling communications among the plurality of tasks based on the scheduling of the plurality of tasks.

2. The method of claim 1, wherein said communication resources include network bandwidth.

3. The method of claim 1, wherein said computation resources include processing resources.

4. The method of claim 1, wherein said computation resources include memory resources.

5. The method of claim 1, wherein said determining step includes determining a machine signature based, at least in part, on communication capacity.

6. The method of claim 1, wherein said generating step includes generating a task signature based, at least in part, upon communication bandwidth required by the task.

7. The method of claim 1, wherein said generating step includes generating a task signature based, at least in part, upon processing resources required by the task.

8. The method of claim 1, wherein said generating step includes generating a task signature based, at least in part, upon synchronization requirements of the task.

9. The method of claim 1, wherein said scheduling step includes scheduling communications among the plurality of tasks.

10. The method of claim 9, wherein scheduling communications includes setting the frequency of communications by a given task.

11. The method of claim 9, wherein scheduling communications includes scheduling a volume of communications by a given task during a particular time period.

12. The method of claim 1, wherein said scheduling step includes specifying a portion of processing resources that may be utilized by a given task.

13. The method of claim 1, wherein said scheduling step includes specifying a portion of the communication resources that may be utilized by a given task.

14. The method of claim 13, wherein specifying a portion of communication resources that may be utilized by a given task includes specifying a volume of data that may be transmitted by the given task during a particular time period.

15. The method of claim 13, wherein specifying a portion of communication resources that may be utilized by a given task includes specifying a frequency of communication by the given task.

16. The method of claim 1, wherein said controlling step includes substeps of:

designating an interval for transmission of communications;

holding communications of a given task in a staging area; and regulating the volume of communications of the given task transmitted from the staging area during a particular interval.

17. The method of claim 1, wherein said scheduling step includes specifying a volume of data to be transmitted by a given task during a particular strobe.

18. The method of claim 1, wherein said scheduling step includes specifying whether communications of a given task are to be transmitted during a particular strobe.

19. The method of claim 1, wherein said controlling step includes limiting communications of a given task to a portion of said strobing duration during a particular strobe.

20. The method of claim 1, further comprising:

determining a volume of data corresponding to all communications the plurality of tasks are requesting to send during a particular strobe; and if said volume of data does not exceed the strobing duration, transmitting all communications of the plurality of tasks during the particular strobe.

21. The method of claim 20, further comprising:

otherwise, if said volume of data is greater than the strobing duration, determining a portion of the communications of a given task that may be transmitted during the particular strobe.

22. A system allocating resources of a plurality of processors to a plurality of tasks based upon signatures of the tasks, the system comprising:

a plurality of tasks, at least some tasks having a task signature characterizing processing and communication resources required by the task;

a plurality of processors having processing resources for executing the plurality of tasks, communication resources which allow the plurality of processors to communicate with one another;

a task scheduler for allocating processing resources and communication resources to the plurality of tasks based, at least in part, on the task signatures, wherein said task scheduler establishes a strobing interval comprising a period of time between successive strobes in which communications are transmitted and establishes a strobing duration comprising a maximum volume of data that may be communicated in a strobe; and a communication module for regulating usage of communication resources based on the allocation of communication resources by the task scheduler.

23. The system of claim 22, wherein said communication resources include network bandwidth.

24. The system of claim 22, wherein said processing resources include computer processing unit (CPU) resources.

25. The system of claim 22, wherein said task scheduler establishes a frequency of communications by a given task.

26. The system of claim 22, wherein said task scheduler specifies a volume of communications by a given task during a particular time period.

27. The system of claim 22, wherein said task scheduler designates an interval for transmission of communications.

28. The system of claim 27, wherein said communication module holds communications of a given task in a staging area for possible transmission during a particular interval.

29. The system of claim 28, wherein said communication module regulates a volume of communications sent by the given task during the particular interval.

30. The system of claim 22, wherein said task signature is based on a selected one of communication resources required by the task, computation resources required by the task, and synchronization resources required by the task.

31. The system of claim 22, wherein said task scheduler specifies a portion of the processing resources that may be utilized by a given task.

32. The system of claim 22, wherein said task scheduler specifies a portion of the communication resources that may be utilized by a given task.

33. The system of claim 32, wherein specifying a portion of communication resources that may be utilized by a given task includes specifying a volume of data that may be transmitted by the given task during a particular time period.

34. The system of claim 32, wherein specifying a portion of communication resources that may be utilized by a given task includes specifying a frequency of communication by the given task during a particular time period.

35. The system of claim 22, wherein said task scheduler specifies a volume of data to be transmitted by a given task during a particular strobe.

36. The system of claim 22, wherein said task scheduler specifies whether communications of a given task are to be transmitted during a particular strobe.

37. The system of claim 22, wherein said task scheduler determines a portion of said strobing duration that may be utilized by communications of a given task.

38. The system of claim 22, wherein said communication module determines a volume of data corresponding to all communications the plurality of tasks are attempting to send during a particular strobe.

39. The system of claim 38, wherein said communication module transmits all communications of the plurality of tasks during the particular strobe if the determined volume of data does not exceed the strobing duration.

40. The method of claim 38, wherein said communication module transmits a portion of all communications of the plurality of tasks during the particular strobe if the determined volume of data is greater than the strobing duration.

* * * * *